US012242479B1

(12) United States Patent
Ma et al.

(10) Patent No.: US 12,242,479 B1
(45) Date of Patent: Mar. 4, 2025

(54) AUTOMATIC INDEX RECOMMENDATIONS FOR IMPROVED QUERY PERFORMANCE

(71) Applicant: SAP SE, Walldorf (DE)

(72) Inventors: Yu Ma, Xi'an (CN); Jing He, Xi'an (CN); Fu-qiang Lv, Xi'an (CN); Haotian Zhou, Xi'an (CN); Xiaotao Wang, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/428,740

(22) Filed: Jan. 31, 2024

(51) Int. Cl.
  *G06F 16/00* (2019.01)
  *G06F 16/2453* (2019.01)

(52) U.S. Cl.
  CPC .............. *G06F 16/24542* (2019.01)

(58) Field of Classification Search
  CPC ................................. G06F 16/24542
  USPC ...................................... 707/715
  See application file for complete search history.

(56) References Cited

U.S. PATENT DOCUMENTS

| 10,534,585 | B1 | 1/2020 | Eberlein et al. |
| 11,138,266 | B2 | 10/2021 | Ding et al. |
| 11,604,777 | B1 | 3/2023 | Fritz et al. |
| 2016/0034530 | A1 | 2/2016 | Nguyen et al. |
| 2016/0378822 | A1* | 12/2016 | Jovanovic ........... G06F 16/2228 707/715 |

FOREIGN PATENT DOCUMENTS

| CN | 113568888 | 10/2021 |
| CN | 114064689 | 2/2022 |
| CN | 115408386 | 11/2022 |

* cited by examiner

*Primary Examiner* — Chelcie L Daye
(74) *Attorney, Agent, or Firm* — SCHWEGMAN LUNBERG & WOESSNER, P.A.

(57) ABSTRACT

Systems and methods described herein relate to automatic index recommendations for improved database query performance. Candidate indexes are identified. The candidate indexes are associated with a database query that is classified as a slow query. A feature vector is generated for each candidate index to represent statement features and statistical features associated with the candidate index. The feature vectors are provided to one or more machine learning models to obtain an index recommendation value for each candidate index. An index recommendation is presented at a user device. The index recommendation identifies a first index of the candidate indexes based at least partially on the index recommendation value obtained for the first index. User input indicative of a user selection of the first index is received. A database schema is updated to include the first index in response to the user input.

20 Claims, 10 Drawing Sheets

500

502 →
```
SELECT *
FROM CUSTOMER, VENDOR
WHERE C_A = 1 AND C_B = 2 AND C_C = V_A
ORDER BY C_D
```

504 →

| TABLE | COLUMN | JOIN | EQUAL | RANGE | CARDINALITY | SELECTIVITY | LABEL |
|---|---|---|---|---|---|---|---|
| CUSTOMER | C_A | 0 | 1 | 0 | 500 | 0.8 | -1 |
| CUSTOMER | C_B | 0 | 1 | 0 | 200 | 0.4 | -1 |
| CUSTOMER | C_C | 1 | 0 | 0 | 500 | 0.6 | -1 |
| CUSTOMER | C_D | 0 | 0 | 0 | 300 | 0.2 | -1 |

504 →

| TABLE | COLUMN | JOIN | EQUAL | RANGE | CARDINALITY | SELECTIVITY | LABEL |
|---|---|---|---|---|---|---|---|
| VENDOR | V_A | 1 | 0 | 0 | 500 | 0.55 | +1 |

506 →

| TABLE | COLUMN | JOIN1 | EQUAL1 | RANGE1 | JOIN2 | EQUAL2 | RANGE2 | JOIN3 | EQUAL3 | RANGE3 | T. COUNT | SELECTIVITY | LABEL |
|---|---|---|---|---|---|---|---|---|---|---|---|---|---|
| CUSTOMER | C_A C_B C_C | 0 | 1 | 0 | 0 | 1 | 0 | 1 | 0 | 0 | 1000 | 0.95 | +1 |
| CUSTOMER | C_A C_B C_D | 0 | 1 | 0 | 0 | 1 | 0 | 0 | 0 | 0 | 1000 | 0.9 | -1 |

FIG. 5

AUTOMATIC INDEX RECOMMENDATIONS FOR IMPROVED QUERY PERFORMANCE

TECHNICAL FIELD

The subject matter disclosed herein generally relates to the use of indexes to improve database query performance. More specifically, but not exclusively, the subject matter relates to systems and methods suitable for providing automatic index recommendations.

BACKGROUND

Indexes are an important tool for addressing slow queries in database systems. A database query can be classified as a "slow query" if, for example, its execution time exceeds a predetermined threshold (e.g., the database query takes longer than 1 second to execute) or it is flagged for attention based on user complaints relating to its execution time.

While creating indexes can reduce the number of slow queries and thereby improve database query performance, indexes should be selected with care, as they can introduce additional overhead in a database system. Identifying a suitable index can be a difficult or time-consuming task, particularly in large, dynamic database systems in which multiple indexes can potentially be implemented in an attempt to address a slow query. Moreover, once a suitable index has been identified, evaluating its performance and integrating it into a database schema may pose technical challenges.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

FIG. 5 shows a database query and multiple tables to illustrate aspects of index vectorization performed to generate training data, according to some examples.

DETAILED DESCRIPTION

Figure 1:
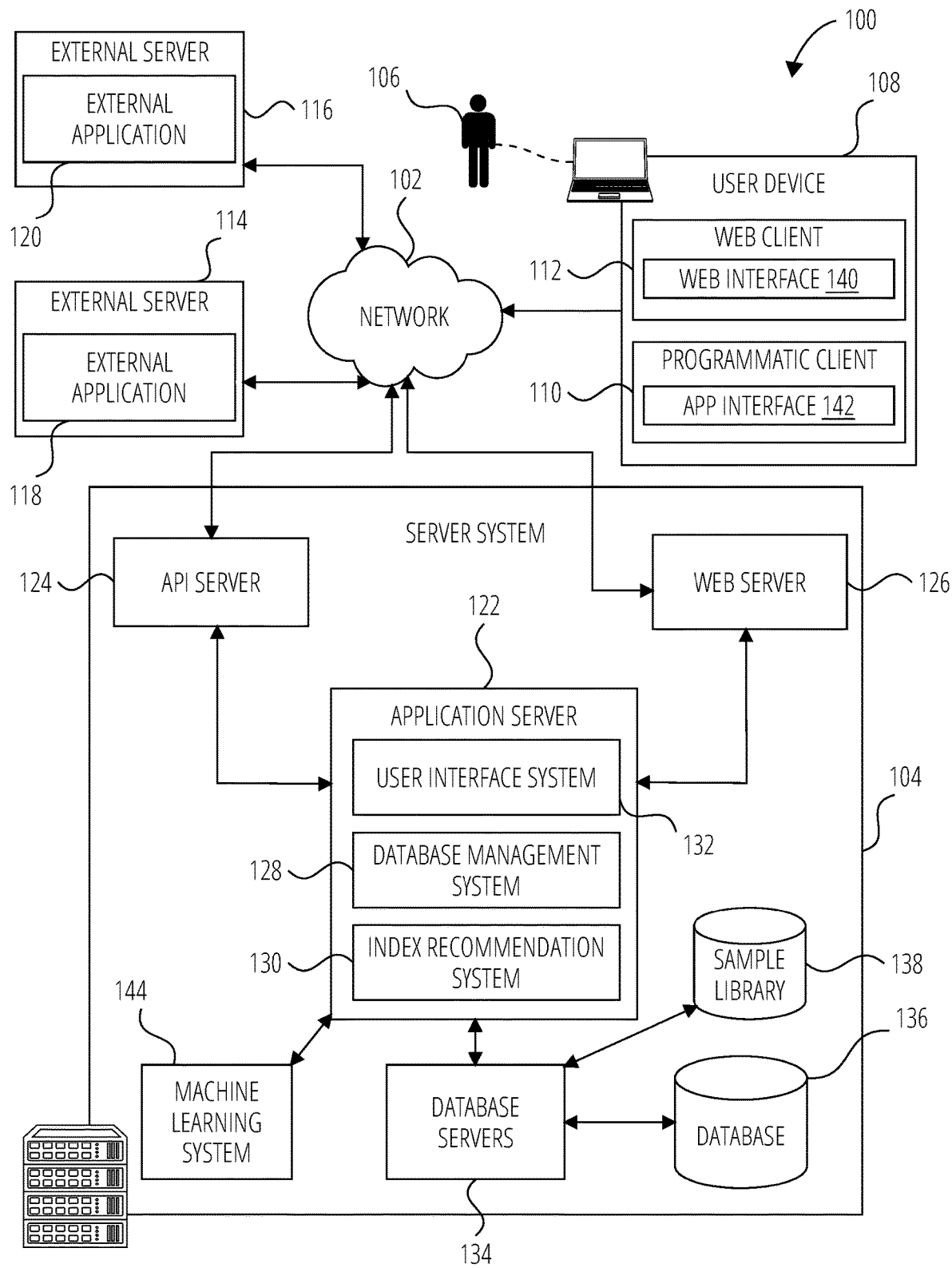
FIG. 1 is a diagrammatic representation of a network environment that includes a database management system and an index recommendation system, according to some examples.

Establishing suitable indexes can be an effective method to reduce the occurrence of slow queries in database systems. Systems and methods described herein enable the automatic generation of index recommendations for improved database query performance. Example techniques described herein allow for automatic analysis of slow queries, generation of suitable index recommendations, and integration of selected indexes into database schemas, thereby providing a targeted technical solution for performance improvement.

In some examples, slow queries are analyzed by using one or more machine learning models. The one or more machine learning models may be trained using vectorized data representing characteristics of existing or suitable indexes. After training, values generated by a machine learning model during inference may be used to generate an index construction plan likely to improve database query performance.

An example method may include identifying a plurality of candidate indexes associated with a database query that is classified as a slow query. The terms "database query" and "query" are used interchangeably in the context of the present disclosure.

Prior to identifying the plurality of candidate indexes, the slow query may be detected or classified. For example, a system may detect that a query execution time of the database query exceeds a threshold, and, in response to detecting that the query execution time associated with the database query exceeds the threshold, designate the database query as a slow query (e.g., by flagging a record of the slow query in a database). In some examples, designation of the database query as a slow query automatically triggers further operations, such as the obtaining of index recommendation values for candidate indexes, as described below.

The database query that is classified as a slow query may be one of a plurality of database queries monitored using an index recommendation application. For example, the index recommendation application may monitor the query execution time of each of the plurality of database queries to determine whether to flag one or more of them as slow queries. In some examples, the index recommendation application is implemented as a microservice that automatically monitors database queries and triggers the generation of index recommendations where database queries are found to meet one or more requirements associated with slow queries.

In some examples, a feature vector is generated for each candidate index associated with a slow query. The feature vector may represent one or both of statement features and statistical features associated with the candidate index. For example, the statement features may indicate a location of each of one or more candidate index columns of a candidate index within the database query. The statement features may encode such location by an encoding scheme that indicates presence or absence of respective query conditions involving the candidate index column (e.g., using one-hot encoding).

The statistical features in the feature vector may comprise at least one of: a selectivity value associated with the database query, a cardinality value associated with the database query, number of null values in each of one or more candidate index columns of a candidate index, or number of rows associated with each of the one or more candidate index columns. The method may include parsing the database query (e.g., using a Structured Query Language (SQL) parser) to extract information from the database query. A syntactic analysis operation may be performed on the information to obtain the statement features. A statistical analysis may be performed on the information to obtain the statistical features.

The method may include providing the feature vectors generated for the candidate indexes to one or more machine learning models to obtain, for each candidate index, an index recommendation value. The index recommendation value may, for example, comprise a likelihood score. The system may automatically present an index recommendation at a user device. The index recommendation may identify one or more indexes from the plurality of multi-column candidate indexes for selection, approval, or modification by a user.

In some examples, the index recommendation identifies at least a first index of the plurality of candidate indexes based at least partially on the index recommendation value obtained for the first index. The method may include receiving a user selection of the first index. In response to receiving the user input, a database schema may be automatically updated to include the first index.

The method may further include, prior to the presentation of the index recommendation at the user device, assessing performance of the first index according to a predetermined performance metric. The performance metric can, for example, relate to an improvement or expected improvement in execution time associated with implementation of the first index.

Assessing of the performance of the first index may include determining a first query execution time of the database query without applying the first index, determining a second query execution time of the database query by applying the first index, and comparing the first query execution time to the second query execution time. In some examples, to assess the performance of a candidate index based on the performance metric, the candidate index is executed against a subset of data from a database associated with the database query. Such a subset of data is referred to herein as a "sample library." The first index may thus be selected based at least partially on the performance of the first index.

In some examples, the system causes presentation of the index recommendation at the user device within a user interface that presents the index recommendation together with an indication of the performance of the first index. In this way, a user may be provided with an automatically generated option to select an index while simultaneously being enabled to review expected improvements associated with selection of the index. This can, for example, allow a user to make a more informed decision by assessing the expected improvements against other factors, such as increased overhead, prior to allowing integration of the selected index.

The plurality of candidate indexes may include different types of indexes. For example, in a columnar storage context, at least one of the plurality of candidate indexes can be a multi-column candidate index (e.g., a two-column index or a three-column index), in which case the feature vector for the multi-column candidate index may be generated by generating column-specific values indicative of characteristics of individual columns in the multi-column candidate index, generating multi-column values indicative of combined characteristics of the individual columns in the multi-column candidate index, and combining the column-specific values and the multi-column values.

In some examples, the plurality of candidate indexes comprises a first subset and a second subset, with the first subset including one or more single-column candidate indexes and the second subset including one or more multi-column candidate indexes. As a specific, non-limiting example, the plurality of candidate indexes can include a first subset of one or more single-column candidate indexes, a second subset of one or more two-column candidate indexes, and a third subset of one or more three-column candidate indexes.

The one or more machine learning models may include separate machine learning models trained to process feature vectors for respective types of the candidate indexes. For example, the one or more machine learning models may include a first machine learning model that is trained to process each feature vector of the one or more single-column candidate indexes and at least one second machine learning model that is trained to process each feature vector of the one or more multi-column candidate indexes. As a specific, non-limiting example, the system may execute a single-column model to process feature vectors for single-column candidate indexes, a two-column model to process feature vectors for two-column candidate indexes, and a three-column model to process feature vectors for three-column candidate indexes.

In some examples, the system may automatically recommend at least one candidate index of each type of candidate index. For example, where the candidate indexes include the first subset, the second subset, and the third subset, the system may automatically recommend a highest-scoring candidate index from each subset based on their respective index recommendation values.

Each machine learning model may be trained using a dataset comprising sample feature vectors, where each sample feature vector is labeled to indicate whether a sample index corresponding to the sample feature vector exists in a sample database. A positive label may thus, for example, indicate a desirable index or an index that is associated with performance improvement. The machine learning model may, for example, be a binary classification model trained to predict the presence or absence of an index based on the feature vector. The machine learning model may, in some examples, output a predicted label and a confidence score (as an example of an index recommendation value).

Examples described herein may address or alleviate one or more technical problems. At least some technical problems with database management systems may stem from or relate to reliance on manual index management by database administrators or developers. Manual index management may include, for example, manual analysis of query patterns or data access paths and manual creation of indexes to optimize query performance. These processes are not only time-consuming but also prone to human error, especially in complex databases with large volumes of data and high query diversity.

A slow query may involve multiple columns of a database table, and a developer may need to analyze and test various possible indexes (e.g., various single-column options and multi-column options) to determine which index is likely to address the issue. In large, complex or interconnected database tables, it may be difficult or impractical for the developer to identify optimal or near-optimal indexes without expending excessive time or computing resources.

Such technical problems may be addressed or alleviated by providing an automated index recommendation system that leverages machine learning algorithms to efficiently analyze query and index data. A system described herein may automatically identify indexing opportunities and suggest optimal or near-optimal indexes without the need for manual intervention. This may reduce errors and ensure that the database is continuously or periodically optimized for query workloads.

Technical problems may also stem from inefficient analysis of query performance as part of determining the need for indexing or selecting suitable indexes. A database management system may lack the capability to process and analyze vast amounts of query execution data in real-time, leading to delayed or suboptimal index adjustments. This inefficiency can result in persistent performance bottlenecks, as the system may not adapt quickly to changing data access patterns or may overlook subtle yet impactful optimization opportunities.

Examples described herein provide a technical solution to overcome inefficiencies by incorporating one or more performance monitoring components. A performance monitoring component may automatically evaluate query performance or the impact of a candidate index on query performance. This may allow the system to dynamically suggest and integrate index modifications, thereby increasing database system throughput.

Index management may also suffer from technical problems when it comes to scalability and adaptability across diverse and evolving datasets. For example, as the volume of data grows and new types of queries are introduced, it may be challenging to scale and adapt indexes in an efficient manner. For example, in the context of SQL queries, while indexes can improve the performance of "select" queries, they can introduce overhead for "action" queries because the indexes themselves need to be updated when data changes. Such issues may become progressively worse as a dataset grows or evolves. By providing a technical solution for recommending suitable indexes that is based on feature vectors that account for various aspects of queries and their performance, more relevant or effective indexes may be surfaces. This may in turn lead to a better balance between read and write efficiency (e.g., by avoiding having too many indexes that can slow down "action" queries, but still having high-performing queries to speed up "select" queries).

A further technical challenge may be how to integrate user interactivity and feedback into an index establishment process, while still allowing for substantially automated index recommendations and integrations. Examples described herein incorporate user interaction in a seamless or near-seamless manner, reducing the risk of human errors or delays in performance improvements, while still enabling a user to exercise control over certain aspects of the process.

Examples described herein may improve the functioning of a database system by automatically surfacing suitable index recommendations or automatically integrating selected indexes into database schemas, thus leading to improved system performance (e.g., as a result of faster query execution times). When the effects in this disclosure are considered in aggregate, one or more of the methodologies described herein may obviate a need for certain efforts or resources that otherwise would be involved in database management systems. Computing resources utilized by systems, databases, or networks may be more efficiently utilized or reduced, e.g., as a result of a reduction in computing resources needed to perform query log analysis or to perform near-exhaustive testing of large numbers of candidate indexes. Examples of such computing resources may include processor cycles, network traffic, memory usage, data storage capacity, power consumption, and cooling capacity.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 108 that is accessed by a user 106. A web client 112 (e.g., a browser) or a programmatic client 110 (e.g., an "app") may be hosted and executed on the user device 108.

An Application Program Interface (API) server 124 and a web server 126 provide respective programmatic and web interfaces to components of the server system 104. An application server 122 hosts a database management system 128, an index recommendation system 130, and a user interface system 132, each of which includes one or more components, modules, or applications. It will be appreciated that the database management system 128, the index recommendation system 130, and the user interface system 132 may be distributed across multiple application servers in other examples.

The user device 108 can communicate with the application server 122, e.g., via the web interface supported by the web server 126 or via the programmatic interface provided by the API server 124. It will be appreciated that, although only a single user device 108 is shown in FIG. 1, a plurality of user devices may be communicatively coupled to the server system 104 in some examples. Further, while certain functions may be described herein as being performed at either the user device 108 (e.g., web client 112 or programmatic client 110) or the server system 104, the location of certain functionality either within the user device 108 or the server system 104 may be a design choice.

The application server 122 is communicatively coupled to database servers 134, facilitating access to one or more information storage repository, such as a database 136. In some examples, the database 136 includes storage devices that store information to be processed by the database management system 128, the index recommendation system 130, or the user interface system 132.

The application server 122 accesses application data (e.g., application data stored by the database servers 134) to provide one or more applications or software tools to the user device 108 via a web interface 140 or an app interface 142. As described further below according to examples and with specific reference to FIGS. 2-7, the application server 122, using the database management system 128, may provide one or more tools or functions for database management, including query processing, and using the index recommendation system 130, may provide one or more tools or functions for automated generation of index recommendations.

The database management system 128 is responsible for storage and organization of data. The database management system 128 may handle multiple tasks, such as data retrieval, insertion, update, and deletion operations. The database management system 128 may be implemented using various database models, including but not limited to, relational, NoSQL, or object-oriented databases. The database management system 128 may ensure data integrity and security while providing efficient access through, for example, structured query languages or other database-specific querying mechanisms. In some examples, the database management system 128 is designed to handle large volumes of data and support concurrent access by multiple users or systems.

The index recommendation system 130 is responsible for analyzing database queries and recommending optimal or near-optimal indexing strategies to enhance query performance. Utilizing advanced algorithms, such as machine learning techniques, the index recommendation system 130 may process vectorized data representing details of slow queries to provide index recommendations. The index recommendation system 130 may work with the database management system 128 to implement or manage selected indexes, thereby playing a role in reducing query latency and improving the overall efficiency of the database management system 128.

The user interface system 132 enables users, such as the user 106 of the user device 108, to interact with the database management system 128 or the index recommendation system 130. The user interface system 132 may provide a gateway, via the API server 124 or web server 126, through which database administrators and users can visualize, manage, and manipulate data and system configurations. The user interface system 132 may provide (e.g., via the web interface 140 or the app interface 142) user interfaces with intuitive layouts and controls or instruction interfaces for technical users. For instance, the user interface system 132 may cause display of index recommendations generated by the index recommendation system 130 for review or approval by the user 106. The user interface may include a dedicated section for index management where users can, for example, see active index recommendations, historical decisions, and performance metrics.

In some examples, the user 106 utilizes the database management system 128 to query the database 136. The database management system 128 may implement query procedures or query optimizer to speed up data retrieval.

The index recommendation system 130 in turn operates to generate recommendations for new indexes to integrate with the database 136. In some examples, the index recommendation system 130 is executed as a microservice within the architecture shown in FIG. 1. The index recommendation system 130 may monitor query statistics and detect slow queries (e.g., queries taking longer than 1 second to execute). This may automatically trigger a process of generating an index recommendation that is then presented to the user 106 at the user device 108 via the user interface system 132. Furthermore, if selected, the index recommendation system 130 may cause automatic integration of the selected index into a database schema managed by the database management system 128.

In some examples, to assess performance of an index or candidate index, the index recommendation system 130 utilizes a sample library 138. The sample library 138 is a repository that stores a subset of the data of an actual database to which a query relates (e.g., the database 136). The sample library 138 may contain representative data samples or synthetic data that mimic the characteristics of the full dataset. For example, the sample library 138 may provide a "miniature" version of the database 136 that substantially reflects the distribution of values and table relationships. By applying indexes to the sample library 138 and measuring query performance improvements, the index recommendation system 130 can estimate or predict the potential impact of index changes on an actual database, while reducing computational load associated with performance testing.

The index recommendation system 130 may work with a machine learning system 144 to perform machine learning model training or inference. In some examples, the machine learning system 144 provides machine learning pipelines and models used for generating index recommendations. The machine learning system 144 may provide various capabilities, such as training models, performing inference, and monitoring performance.

The machine learning system 144 may provide automated machine learning capabilities that can generate pipelines tailored to a given process or use case. The machine learning system 144 may determine aspects such as the appropriate data preprocessing, feature engineering, model algorithms, and hyperparameters to use. The machine learning system 144 may leverage training datasets (e.g., training datasets including sample expressions stored in the database 136) to intelligently construct a custom machine learning pipeline. The pipeline provided by the machine learning system 144 may then be used to train, evaluate, and select a model for deployment. This automation may eliminate or reduce the need for time-consuming manual development or refinement of machine learning solutions.

In some examples, the application server 122 is part of a cloud-based platform provided by a software provider that allows the user 106 to utilize the tools of the database management system 128 and the index recommendation system 130. For example, an account holder such as the user 106 may perform queries, manage data in the database 136, and select indexes to integrate into the database 136.

One or more of the application server 122, the database servers 134, the API server 124, the web server 126, the database management system 128, the index recommendation system 130, and the user interface system 132 may each be implemented in a computer system, in whole or in part, as described below with respect to FIG. 10. In some examples, external applications, such as an external application 118 executing on an external server 114 or external application 120 executing on an external server 116, can communicate with the application server 122 via the programmatic interface provided by the API server 124. For example, a third-party application may support one or more features or functions on a website or platform hosted by a third party, or may perform certain methodologies and provide input or output information to the application server 122 for further processing or publication.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

In some examples, the database 136 is a multi-model database that stores data in main memory instead of secondary storage, such as disk storage or solid-state drives. For example, the database management system 128 may provide access to a database 136 that has a column-oriented, in-memory database design. In addition to provide the database 136, the database management system 128 may enable users to access advanced capabilities, such as search, retrieval, analytics, and data integration capabilities.

Figure 2:
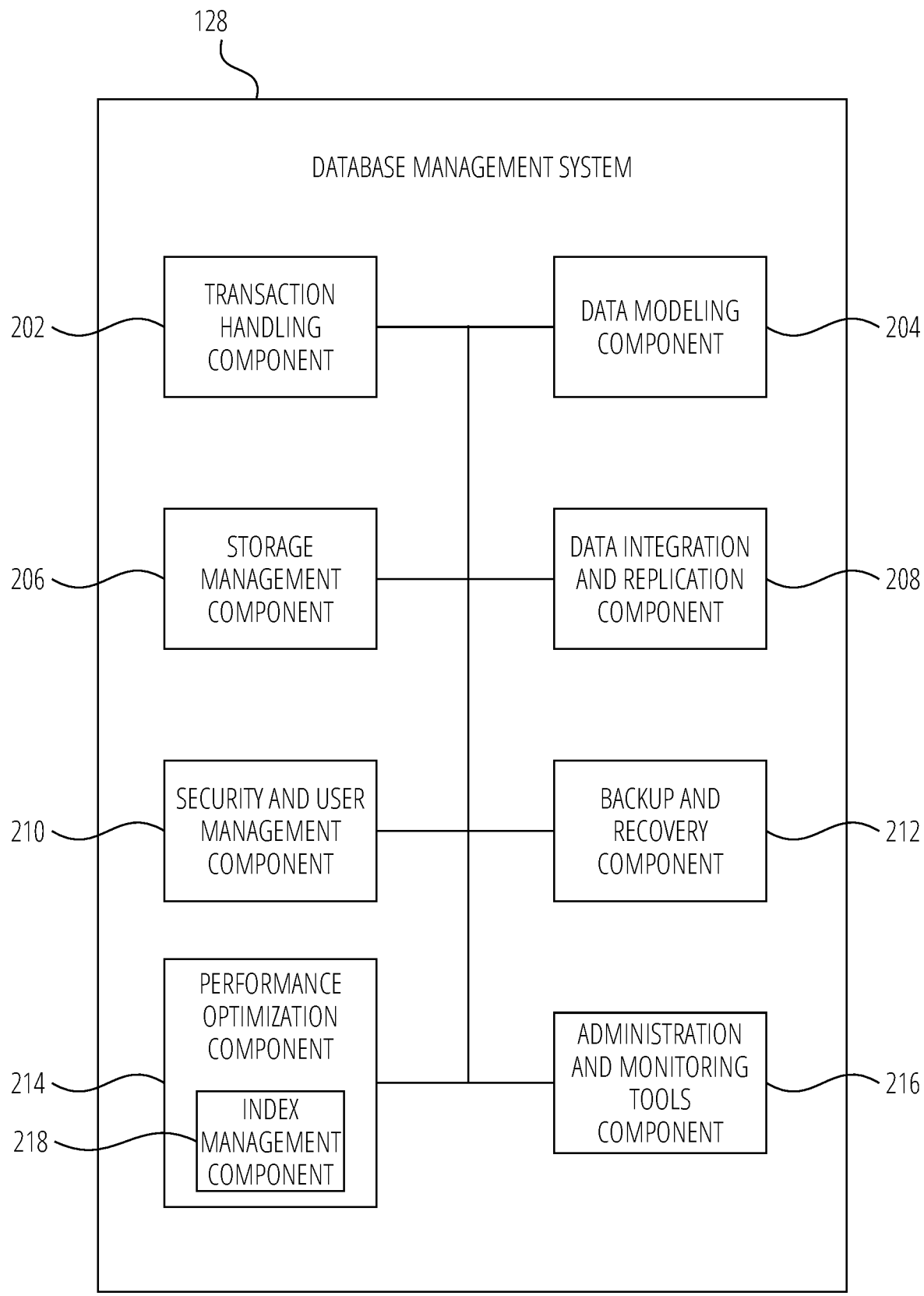
FIG. 2 is a block diagram of certain components of a database management system, according to some examples.

FIG. 2 is a block diagram illustrating certain components of the database management system 128, according to some examples. The database management system 128 is shown to include a transaction handling component 202, a data modeling component 204, a storage management component 206, a data integration and replication component 208, a security and user management component 210, a backup and recovery component 212, a performance optimization component 214, an administration and monitoring tools component 216, and an index management component 218. The user 106 may use the user device 108 to access or interact with components of the database management system 128 via the user interface system 132 of FIG. 1.

The transaction handling component 202 handles database-related transactions, such as database queries, modifications, and other user requests. The transaction handling component 202 is responsible for ensuring the consistency and reliability of transactions executed within database 136. The transaction handling component 202 manages the atomicity, consistency, isolation, and durability (ACID) properties of database transactions, ensuring that database operations are processed reliably and without interference from concurrent transactions. For example, the transaction handling component 202 may utilize locking mechanisms or multi-version concurrency control to maintain data integrity.

During operation, the user 106 may enter a database query via the user device 108. The database query is sent over the network 102 and then handled by the transaction handling component 202. The transaction handling component 202 may be responsible for parsing and executing, for example, SQL queries. The transaction handling component 202 may check queries for correctness, create execution plans, utilize indexes (if any), and perform the required operations based on a user instruction. As described further below, the transaction handling component 202 may work with the performance optimization component 214 to analyze various execution strategies for a query and choose the one with, for example, the lowest estimated cost, based on factors such as data size, indexes, join conditions, and system resources. The transaction handling component 202 may also be responsible for processing results and sending results back to the user 106.

The data modeling component 204 enables the user 106 to create and manage data structures, such as tables, views, and schemas. The data modeling component 204 may support various data modeling paradigms, such as relational and dimensional modeling, allowing for the efficient design of data storage that aligns with business requirements and query patterns.

The storage management component 206 handles allocation, organization, and optimization of data storage. For example, the storage management component 206 may manage storage between on-premise and cloud storage. As mentioned above, in some cases, the database 136 may provide in-memory columnar storage. However, in other cases, the database 136 may provide different types of storage, such as a split between in-memory and secondary storage, which may be facilitated by the storage management component 206. The storage management component 206 may also be responsible for data compression, partitioning, and other storage optimization techniques that enhance system performance and reduce storage footprint.

The data integration and replication component 208 is configured to ensure synchronization and movement of data within and across different environments. It enables the integration of data from various sources, ensuring that the database 136 reflects the most current and accurate information. The data integration and replication component 208 may facilitate data replication for purposes such as disaster recovery, load balancing, or data warehousing. For instance, the data integration and replication component 208 might replicate data from operational databases to analytical systems to support real-time business intelligence without impacting transactional workloads.

The security and user management component 210 operates to manage access controls and protects the database management system 128 and the database 136 against unauthorized access. For example, the security and user management component 210 is responsible for one or more of user authentication, authorization, role-based access control, and auditing capabilities.

The backup and recovery component 212 ensures durability and recoverability of data. The backup and recovery component 212 may provide the user 106 with mechanisms for creating backups of the database 136 at regular intervals or in response to specific events. For example, it may support point-in-time recovery, allowing the database to be restored to a specific moment before a failure occurred.

The performance optimization component 214 provides tools to improve the performance (e.g., query execution speed) of the database 136. For example, the performance optimization component 214 may operate with the transaction handling component 202 to carry out query optimization, in-memory computing optimizations, and automatic tuning of database parameters. The performance optimization component 214 also manages indexes created to facilitate data retrieval or otherwise improve query performance.

The index management component 218 is a sub-component of the performance optimization component 214, as shown in FIG. 2, which facilitates the management of indexes. The index management component 218 may allow the user 106 to create new indexes, modify existing indexes, or delete indexes. The index management component 218 may provide tools for analyzing query patterns and automatically adjusting indexes to suit changing data access patterns. In some examples, the index management component 218 communicates with the index recommendation system 130 to integrate recommended indexes, as surfaced by the index recommendation system 130, into the database 136.

The administration and monitoring tools component 216 provides tools for database administrators to manage and oversee a database system. For example, the user 106 may utilize features of the administration and monitoring tools component 216 to perform system configuration, performance monitoring, troubleshooting, and maintenance operations. The administration and monitoring tools component 216 may work with the user interface system 132 to provide a dashboard for real-time monitoring of system health, alerting administrators to potential issues.

Figure 3:
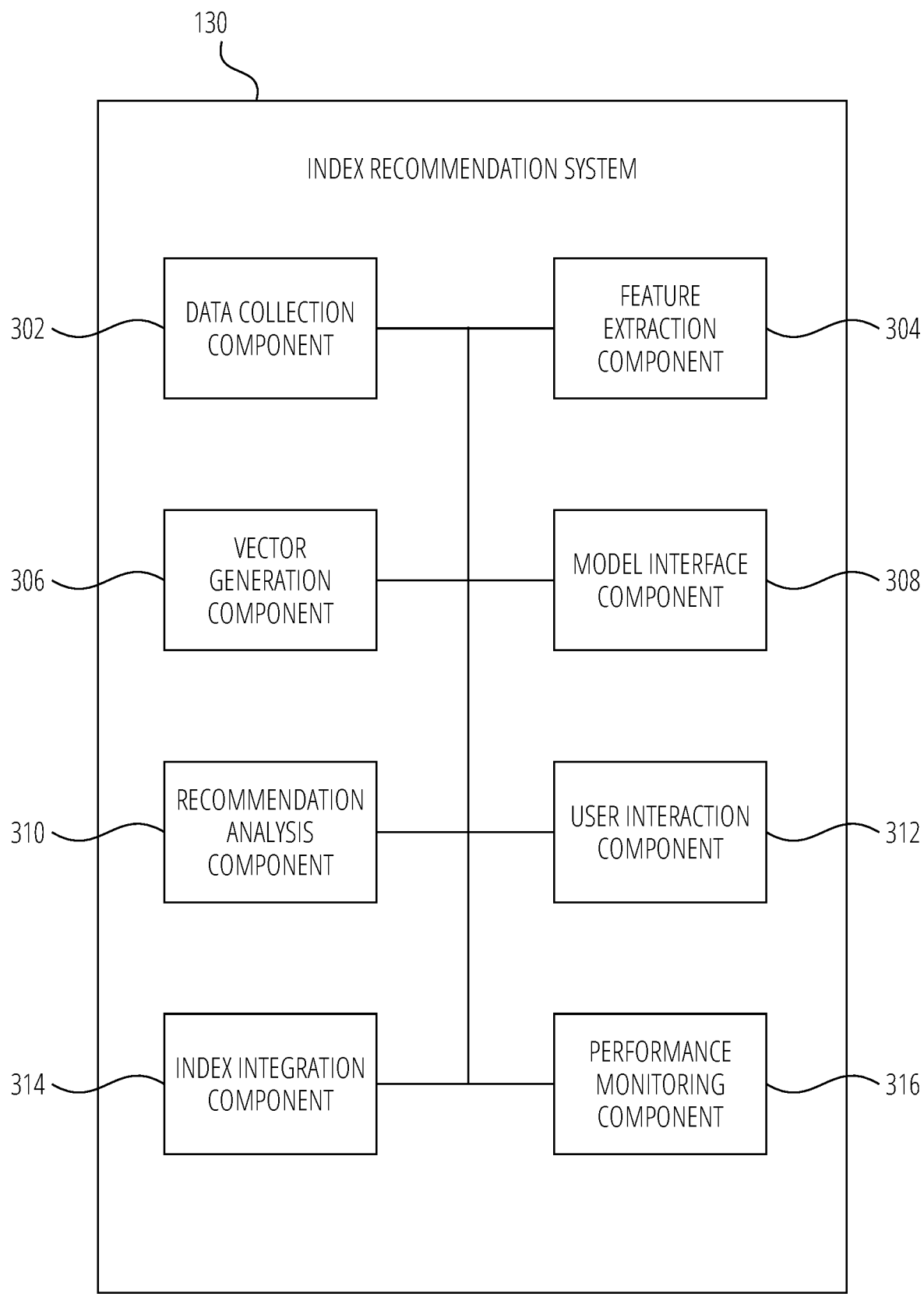
FIG. 3 is a block diagram of certain components of an index recommendation system, according to some examples.

FIG. 3 is a block diagram illustrating certain components of the index recommendation system 130, according to some examples. The index recommendation system 130 is shown to include a data collection component 302, a feature extraction component 304, a vector generation component 306, a model interface component 308, a recommendation analysis component 310, a user interaction component 312, an index integration component 314, and a performance monitoring component 316.

The data collection component 302 is responsible for collecting data items that are used to generate index recommendations or data items that are used to monitor or assess performance. For example, the data collection component 302 may gather query logs, execution statistics, or database schema information. In some examples, the data collection component 302 collects data relating to columns involved in queries to identify potential indexing opportunities. The data collection component 302 may be utilized to collect data for training a machine learning model (e.g., as described with reference to FIG. 4 or FIG. 5). The data collection component 302 may also, or alternatively, be used to collect data for use by a trained model to perform inference.

The feature extraction component 304 is configured to extract useful features from data items. For example, the feature extraction component 304 may take data collected by the data collection component 302 and perform statistical analysis to obtain values of statistical features associated with an index (e.g., cardinality or selectivity) or syntactical analysis to obtain values of statement features associated with an index (e.g., to identify whether a column is involved in a range condition, an equal to condition, or some other query condition).

The vector generation component 306 is responsible for generating feature vectors. For example, the vector generation component 306 may take data collected by the data collection component 302, some of which may have been processed by the feature extraction component 304, and generate vectors in a structured format to represent features of a candidate index. For example, the vector generation component 306 can encode aspects of the data into a machine-readable format that can be processed by machine learning algorithms. In some examples, the vector generation component 306 represents the presence or absence of certain SQL operations within a query as a binary vector or vector component, and also encodes statistical features, such as selectivity and cardinality values. The vector generation component 306 may thus convert unstructured or raw data into structured data in a format that can directly be used by a machine learning component.

The model interface component 308 serves as an interface between components of the index recommendation system 130 and one or more machine learning models (e.g., models executed by the machine learning system 144 of FIG. 1). In some examples, the model interface component 308 is used to feed feature vectors to one or more models and retrieve index recommendation values generated by the one or more models. In some examples, the model interface component 308 manages input and output data flow for at least one machine learning model trained using a dataset comprising sample feature vectors, each labeled to indicate whether a sample index corresponding to the sample feature vector exists in a sample database.

The recommendation analysis component 310 is configured to process output of a machine learning model and formulate actionable index recommendations. For example, the recommendation analysis component 310 may analyze index recommendation values (e.g., a likelihood score associated with a predicted label) generated by the machine learning model with respect to a candidate index, and determine whether to suggest the candidate index to a user.

In some examples, the recommendation analysis component 310 evaluates the performance, or the expected performance, of a candidate index prior to causing suggestion of the candidate index to the user. For example, the recommendation analysis component 310 may determine an expected improvement in query execution time associated with implementation of the candidate index and only cause a suggestion of the candidate index to be surfaced if the expected improvement exceeds a threshold. The recommendation analysis component 310 may operate or communicate with the performance monitoring component 316 in this regard.

The user interaction component 312 communicates with the user interface system 132 to ensure that index recommendations are presented to a user (e.g., to the user 106 via the user device 108). For example, the user interaction component 312 may cause presentation of an index recommendation that includes one or more candidate indexes and, optionally, an indication of the expected performance or performance improvement associated with each candidate index. The user interaction component 312 may receive user input and automatically trigger implementation or adjustment of indexes based on the user input.

For example, the user interaction component 312 may cause a user interface at the user device 108 (e.g., the web interface 140) to present three recommended indexes. The user 106 may then select one of the indexes. In response to receiving the user selection, the user interaction component 312 triggers integration of the index into a database schema, as described elsewhere herein.

The index integration component 314 may automate implementation of an approved or selected index. For example, the index integration component 314 may automatically update a database schema to include a selected index based on detecting a user approval. For example, the index integration component 314 may automatically execute the necessary SQL commands to create a new index or adjust the properties of an existing one.

The performance monitoring component 316 is configured to assess the impact of an index on database system performance. For example, the performance monitoring component 316 may be designed to monitor performance metrics or indicators to evaluate the effectiveness of the indexes and provide feedback on the success of recommendations. The performance monitoring component 316 may provide for a feedback loop to facilitate continuous improvement of the index recommendation system 130.

In some examples, at least some of the components shown in FIG. 2 or FIG. 3 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

Figure 4:
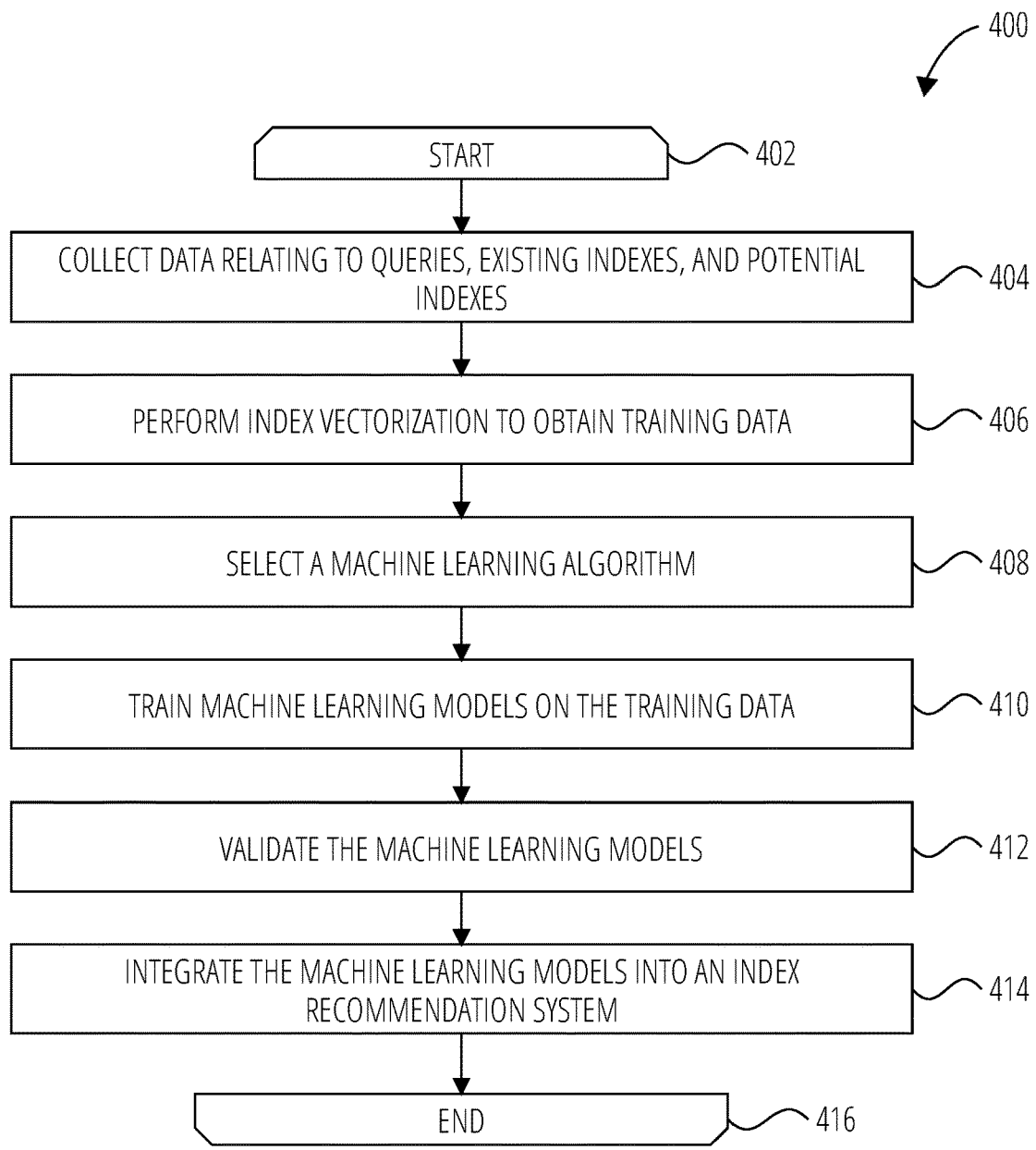
FIG. 4 is a flowchart illustrating operations of a method suitable for training machine learning models to generate index recommendation values, according to some examples.

FIG. 4 is a flowchart illustrating operations of a method 400 suitable for training machine learning models to generate index recommendation values, according to some examples. By way of example and not limitation, aspects of the method 400 may be performed by one or more components, devices, systems, networks, or databases shown in FIG. 1, FIG. 2, or FIG. 3.

Indexes are commonly used to improve database query performance. For instance, a SQL query (e.g., a "select" query that retrieves data from a database using one or more query conditions) may retrieve data faster by scanning an index tree instead of doing a full table scan, thereby reducing query execution time and computational resource consumption. At a high level, the method 400 aims to automate the generation of index recommendations based on the observation that slow queries, possibly due to the absence of appropriate indexes, can exhibit patterns that are not unique to a single database but are instead common across different databases. Accordingly, successful indexing strategies applied to one database could potentially be replicated in others to achieve performance improvements. In other words, if certain queries are slow in one context due to missing indexes, then similar queries (e.g., queries with similar statement features or statistical features) in another context might also benefit from the creation of comparable indexes.

The method 400 commences at opening loop element 402 and proceeds to operation 404, where the index recommendation system 130 collects data relating to various queries, existing indexes, and potential indexes. Operation 404 may involve collection, by the data collection component 302, of data from various databases or other sources. The data may include query logs as well as metadata of existing indexes, such as, for example, the table or tables an index belongs to, the column or columns it includes, and statistical data (e.g., row counts, data distribution, selectivity, cardinality, or the presence of null values). In some examples, the index recommendation system 130 obtains data about existing indexes from the index management component 218 of the database management system 128.

The method 400 proceeds to operation 406, where the index recommendation system 130 performs index vectorization (e.g., using the vector generation component 306). Index vectorization may be performed to allow a machine learning model to identify characteristics of existing indexes and learn relationships between those characteristics and expected performance improvements resulting from indexing.

In some examples, the feature extraction component 304 of the index recommendation system 130 extracts values for statement features and statistical features of each index to be included in a training dataset, and the vector generation component 306 constructs a feature vector for that index based on the statement features and the statistical features. The indexes to be included in the training dataset may include both real indexes (e.g., indexes that exist in one or more databases) and indexes that do not exist (e.g., indexes that could be created but have not been applied to any of the databases from which data items are collected). Since the indexes form part of the training dataset, they may be referred to as sample indexes.

Queries may include query conditions that are used to filter, group, aggregate, or arrange data items. For each sample index, statement features may include characteristics that describe the syntactic roles of one or more columns within a corresponding query. For example, the statement features include information about how columns are used in various SQL clauses and in conjunction with aggregation functions. Statement features may provide insight into the context in which columns are queried, which can influence the decision on whether and how to index them. For example, where a sample index is a single-column index, its statement features describe the location of the column within a query, such as whether the column is part of a "JOIN" clause.

Statistical features may be quantitative attributes that describe, for example, the data distribution and usage statistics of one or more columns within a database. Statistical features may provide insight into the potential effectiveness of an index on query performance by reflecting underlying data characteristics. Accordingly, statistical features may provide useful indications of what the effect of an index on a particular column, or combination of columns, could be in a database.

Table 1 below illustrates and describes non-limiting examples of statement features and statistical features. For example, selectivity, as described in Table 1, may be an important statistical feature. Selectivity provides a measure of "uniqueness" of column values, with higher selectivity potentially indicating greater potential for performance gains from indexing. For example, a column that contains only unique values, such as a primary key, has a selectivity of 1 (or 100%), which is the highest possible selectivity. On the other hand, a column where many rows have the same value would have a selectivity closer to 0 (or closer to 0%), indicating that an index on this column may be less beneficial for query performance. The index may still provide some benefit in the latter case, but performance gains may not be as substantial.

TABLE 1

Examples of statement features and statistical features

| Feature name | Feature type | Description |
| --- | --- | --- |
| Join | Statement feature | A column is used in a "JOIN" operation, such as joining tables. |
| Equal | Statement feature | A column appears in an equality condition, such as use in a "WHERE" clause with equality comparisons. |
| Range | Statement feature | A column appears in a range query condition, such as "BETWEEN." |
| Order by | Statement feature | A column is specified in an "ORDER BY" clause. |
| Aggregation function | Statement feature | A column is used with an aggregation function, such as "AVG," "SUM," "MAX," or "MIN." |
| Null number | Statistical feature | The number of null values in a column. |
| Table count | Statistical feature | The number of rows in the table where a column resides. |
| Selectivity | Statistical feature | Column selection rate. This is a measure of how well an index can filter out rows in a table. Selectively may be the ratio of the number of distinct values in a column (e.g., cardinality) to total number of rows in the table in which it resides. |
| Cardinality | Statistical feature | The number of distinct values in a column. |

A feature vector may be generated based on the statement features and statistical features associated with an index with respect to a sample query. For example, consider a sample query that involves columns A, B, and C of a table, referred to respectively as COLUMN_A, COLUMN_B, and COLUMN_C in this example. To generate a feature vector for each possible single-column index, the statement features associated with the respective column can be encoded (e.g., using one-hot encoding) and the statistical feature values can be added to obtain the feature vector. In some examples, the statistical features may be normalized such that each value in the feature vector is no less than 0 and no more than 1, for example.

Features of a two-column index, such as index (COLUMN_A, COLUMN_B) may be formed by concatenating the features of the single-column indexes index (COLUMN_A) and index (COLUMN_B). Furthermore, common or combined statistical feature values, such as a common or combined cardinality value or a common or combined selectivity value when considering both columns, may be added as one or more additional statistical features such that the feature vector of a two-column index more fully describes its underlying statistics. A similar approach may be followed to build feature vectors for a three-column candidate index index (COLUMN_A, COLUMN_B, COLUMN_C).

A label may be added to each feature vector to allow for supervised learning. For example, if the index index (COLUMN_A) already exists in an operational database, a positive label can be added. On the other hand, if, for example, the index index (COLUMN_B) does not exist, it can be labeled with a negative label. In other words, the feature vector for index (COLUMN_A) may then be a positive vector (+1) while the feature vector for index (COLUMN_B) may then be a negative vector (−1). Other criteria may be used for labeling in other examples. For example, if a sample index has shown to improve query performance by more than a predetermined threshold, its feature vector may be positively labeled, while other samples may be negatively labeled.

FIG. 5 is a diagram 500 that illustrates a database query in the example form of sample query 502 and multiple tables to illustrate aspects of index vectorization performed to generate training data, according to some examples. The sample query 502 is a SQL statement that involves two tables (CUSTOMER and VENDOR) and five columns, as shown in FIG. 5.

In the method 400 of FIG. 4 and the diagram 500 of FIG. 5, single-column indexes, two-column indexes, and three-column indexes are considered. However, it will be appreciated that, in other examples, fewer types of indexes can be considered (e.g., only single-column indexes or only single-column and two-column indexes) or a greater number of index types can be considered (e.g., four-column indexes may also be considered).

To perform index vectorization in the case of FIG. 5, a feature vector is generated for each possible index of each of the three types. This includes the five single-column indexes shown in FIG. 5 (for C_A, C_B, C_C, C_D, and V_A), as well as all possible two-column index combinations (not shown in FIG. 5), and all possible three-column indexes. Only two examples of three-column indexes (for the combination of C_A, C_B, and C_C, and the combination of C_A, C_B, and C_D) are shown in FIG. 5. FIG. 5 thus illustrates examples of single-column index vectorization 504 and multi-column index vectorization 506.

For each feature vector, statement features are encoded using one-hot encoding. For example, for the single-column index on column C_A, one-hot encoding is used to indicate that the column is involved in an "EQUAL" query condition, but not involved in a "JOIN" or a "RANGE" query condition. It will be appreciated that the statement features shown in FIG. 5 are non-limiting examples, and that additional or alternative statement features may be included.

Furthermore, for each feature vector, statistical features are added to the feature vector. For example, for the single-column index on column C_A, its cardinality and selectivity values with respect to the sample query 502 are added. It will again be appreciated that the statistical features in FIG. 5 are non-limiting examples, and that additional or alternative statistical features may be included.

As mentioned above, for a multi-column index, a feature vector may be extended to include not only individual statement and statistical feature values of constituent columns, but also values indicative of combined features. As shown in FIG. 5, individual statement feature values can be concatenated, and statistical feature values can be added to the feature vector. For example, for a three-column index, the selectivity value may be based on the combined uniqueness of the three columns together.

A feature vector is also labeled to mark each sample index as a positive sample (+1) or a negative sample (−1), based on whether the sample index corresponds to an actual or existing index in the collected data. Accordingly, the full feature vector for the sample index index (C_A) is [0, 1, 0, 500, 0.8, −1] and the full feature vector for the sample index index (C_A, C_B, C_C) is [0, 1, 0, 0, 1, 0, 0, 0, 0, 1000, 0.95, +1]. The positive label for the sample index index (C_A, C_B, C_C) might indicate that the index is beneficial for query performance, while the negative label for the sample index index (C_A) might indicate that it would not be beneficial (or sufficiently beneficial) for query performance.

Referring again to FIG. 4, the feature vectors obtained during operation 406 are then used as training data to train one or more machine learning models. By including both positive and negative examples in the training data, a machine learning model may learn to distinguish between effective and ineffective indexes.

The method 400 thus proceeds to operation 408 which includes selecting a machine learning algorithm. After collecting sufficient training data (by way of example and without limitation, 10,000 or 15,000 training samples could be obtained per machine learning model to be trained), it is necessary to choose a suitable machine learning algorithm for training. In the case of FIG. 4, the Categorical Boosting (CATBoost) algorithm is selected. CATBoost is based on gradient boosting on decision trees. It is noted that this algorithm is a non-limiting example, and that other algorithms may also be employed. For example, another algorithm for training a binary classification model, such as Extreme Gradient Boosting (XGBoost), can be used.

At operation 410, machine learning models are trained on the training data. In some examples, the machine learning system 144 of FIG. 1 is used to perform or facilitate training. In the case of FIG. 4, a separate binary classification model is trained for each type of index. In other words, a first machine learning model is trained to process single-column feature vectors, a second machine learning model is trained to process two-column feature vectors, and a third machine learning model is trained to process three-column feature vectors.

During the training process for each model, the input data is a feature vector of a sample index, and the predicted value is the label corresponding to that feature vector. Accordingly, the machine learning model is trained to predict whether the feature vector has a positive label or a negative label, and outputs a probability score together with the predicted label. The model learns by adjusting its internal parameters to minimize the difference between its predictions and the actual labels. Through iterative training with a large and diverse set of feature vectors, the model becomes capable of generalizing from the training data to predict the utility of new, unseen indexes.

Each trained model can then output an index recommendation value for a candidate index. The index recommendation value (e.g., the probability score) may indicate the likelihood that the index will improve the performance of a slow query or the likelihood that the index will not improve the performance of a slow query. In some examples, the method 400 includes validating the machine learning models at operation 412. This may ensure that the model performs well or satisfactorily on unseen data. Common validation metrics include precision, recall, and F1 score (the latter providing a single score that balances precision and recall).

The trained machine learning models are integrated into the index recommendation system 130 at operation 414. For example, the model interface component 308 of the index recommendation system 130 may be communicatively coupled to the machine learning system 144 such that feature vectors can be automatically communicated to the machine learning system 144 for inference by the appropriate trained model. The method 400 ends at closing loop element 416.

Accordingly, in some examples, the index recommendation system 130 can be deployed not only to recognize when a query is underperforming but also to suggest an appropriate index based on learned patterns from a wide array of databases. The index recommendation system 130 may utilize insights from "big data" and the predictive power of machine learning to recommend indexes that are tailored to enhance the speed or efficiency of database queries.

Figure 6:
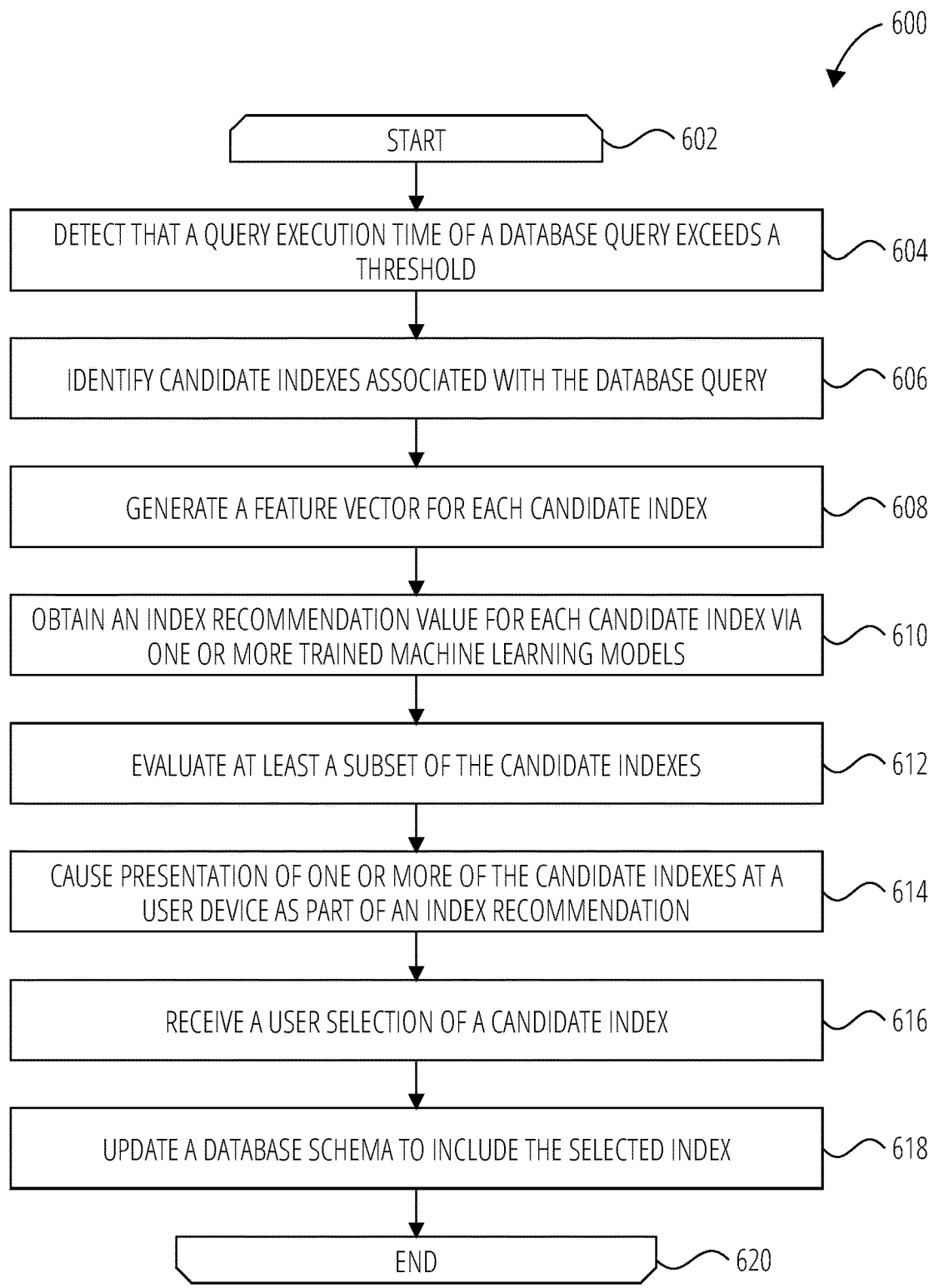
FIG. 6 is a flowchart illustrating operations of a method suitable for automatically generating an index recommendation to address a slow query, according to some examples.
Figure 7:
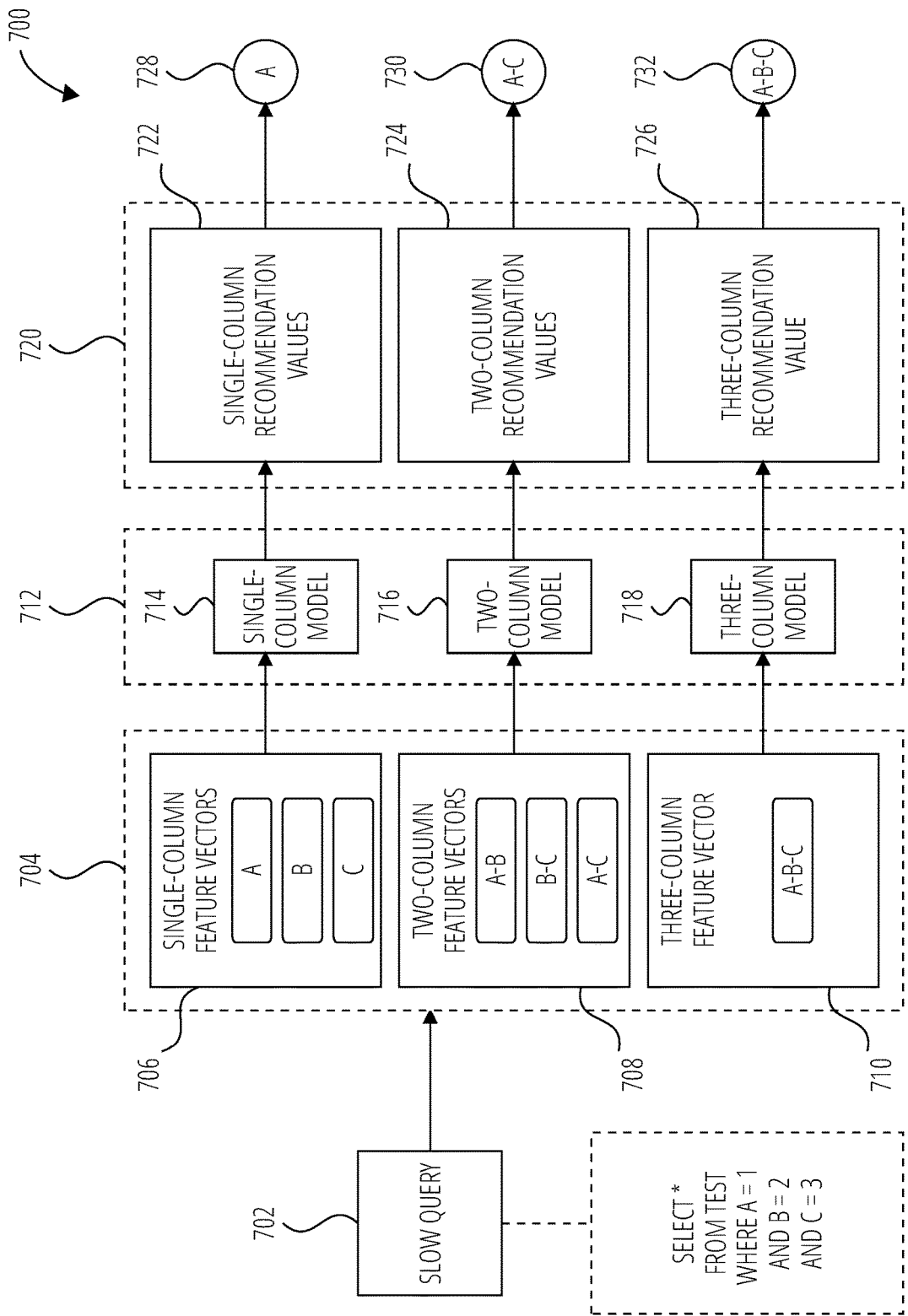
FIG. 7 is a diagrammatic illustration of generation of an index recommendation, according to some examples, in which an index recommendation system employs three different machine learning models to generate index recommendation values.

FIG. 6 is a flowchart illustrating operations of a method 600 for automatically generating an index recommendation to address a slow query, according to some examples. By way of example and not limitation, aspects of the method 600 may be performed by one or more components, devices, systems, networks, or databases shown in FIG. 1, FIG. 2, or FIG. 3. Furthermore, the method 600 is described with reference to a non-limiting example depicted in FIG. 7. FIG. 7 is a diagram 700 that illustrates generation of an index recommendation, according to some examples, in which the index recommendation system 130 employs three different machine learning models to generate index recommendation values (e.g., as described in the method 400 of FIG. 4).

The method 600 commences at opening loop element 602, and proceeds to operation 604, where the index recommendation system 130 detects that the query execution time of a database query exceeds a threshold. For example, the index recommendation system 130 may use one or both of the data collection component 302 and the performance monitoring component 316 to check database queries made by users (e.g., the user 106 of FIG. 1) and to determine whether the database queries are being executed sufficiently quickly.

For instance, the threshold may be 1 second, with the index recommendation system 130 flagging a database query with a query execution time of more than 1 second as being a slow query. The index recommendation system 130 may, in some cases, check average query execution times to make this determination.

In some examples, the user 106 or an administrator enables a feature for index recommendation in the context of the database management system 128 and the database 136. The index recommendation system 130 may run as a microservice that monitors database queries of the user 106 and automatically triggers index recommendations for detected slow queries to improve the functioning of the database management system 128 and the database 136. The index recommendation system 130 may also automatically surface its index recommendations for user consideration or approval, as described in greater detail below.

Referring to FIG. 7, a slow query 702 is shown merely as an example. The slow query 702 involves three columns (A, B, and C) from a table (TEST). The index recommendation system 130 may detect the slow query 702 and automatically trigger the obtaining of index recommendation values to address the slow query 702.

At operation 606 of FIG. 6, the method 600 includes identifying candidate indexes associated with the slow query 702. The index recommendation system 130 automatically identifies that three candidate indexes can be generated for the respective columns (A, B, and C), that three further candidate indexes can be generated for respective pairs of the columns (A-B, B-C, and A-C), and that another candidate index can be generated for the combination of all three columns (A-B-C). Accordingly, in the case of diagram 700, operation 606 involves identifying seven different candidate indexes associated with the slow query 702.

Then, at operation 608, the index recommendation system 130 uses the vector generation component 306 to generate a feature vector for each of the candidate indexes. For example, using the feature engineering process as described with reference to FIG. 4 and FIG. 5, the index recommendation system 130 can perform vectorization 704 to obtain three single-column feature vectors 706, three two-column feature vectors 708, and one three-column feature vector 710, as shown in FIG. 7.

In some examples, each feature vector represents both statement features and one or more statistical features of the respective candidate index. For example, the single-column feature vectors 706 may each have the format [JOIN, EQUAL, RANGE, ORDER_BY, CARDINALITY, SELECTIVITY], with the feature vector for candidate_index (A) being [0, 1, 0, 0, 500, 0.6]. In this case, the statement features are encoded using one-hot encoding to encode the presence of the equality query condition in the slow query 702, while the statement features are added as the final two vector values.

As explained elsewhere, for the two-column feature vectors 708 and the three-column feature vector 710, each feature vector may include both individual feature vector values of respective columns and values representing combined characteristics of columns. Accordingly, the index recommendation system 130 may generate column-specific values indicative of characteristics of individual columns in a multi-column candidate index (e.g., individual statement feature values) as well as multi-column values indicative of combined characteristics of the individual columns in the multi-column candidate index (e.g., statistical feature values for combined columns), and combine or concatenate the column-specific values and the multi-column values to form the feature vector. Merely as an example, the three-column feature vector 710 for candidate_index (A-B-C) may have the following format: [JOIN_A, EQUAL_A, RANGE_A, ORDER_BY_A, JOIN_B, EQUAL_B, RANGE_B, ORDER_BY_B, JOIN_C, EQUAL_C, RANGE_C, ORDER_BY_C, COMBINED_CARDINALITY_A_B_C, COMBINED_SELECTIVITY_A_B_C].

The feature vectors are then provided to machine learning models to obtain index recommendation values at operation 610. In the case of FIG. 7, the index recommendation system 130 utilizes separate machine learning models per type of candidate index. Specifically, and as shown in FIG. 7, during inference 712, a single-column model 714 is fed with the single-column feature vectors 706, a two-column model 716 is fed with the two-column feature vectors 708, and a three-column model 718 is fed with the three-column feature vector 710.

For each candidate index, the output of inference 712 is one or more index recommendation values. For example, for each candidate index, the index recommendation system 130 may receive a predicted label and a probability value or confidence score from the machine learning system 144. As described with reference to FIG. 4, a training process may involve using labeled data, where each feature vector in the training dataset is associated with a label indicating whether the relevant index is positive (e.g., beneficial for query performance) or negative (e.g., not beneficial or not implemented).

The outputs of the single-column model 714, the two-column model 716, and the three-column model 718 are analyzed. As shown in FIG. 7, analysis 720 is performed by the index recommendation system 130 (e.g., using the recommendation analysis component 310) on single-column recommendation values 722 generated for the respective single-column feature vectors 706, two-column recommendation values 724 generated for the respective two-column feature vectors 708, and a three-column recommendation value 726 generated for the three-column feature vector 710. For example, the index recommendation system 130 may analyze the index recommendation values to determine whether the predicted labels are positive and, for candidate indexes with positive predicted labels, what the probability values or confidence scores are.

In the case of FIG. 7, the index recommendation system 130 selects one candidate index corresponding to one of the single-column feature vectors 706 (e.g., the highest-scoring positively labeled candidate index), one candidate index corresponding to one the two-column feature vectors 708 (e.g., the highest-scoring positively labeled candidate index), and the candidate index corresponding to the three-column feature vector 710 (assuming, for example, that it has a positive predicted label). Accordingly, the index recommendation system 130 generates a recommended index 728, a recommended index 730, and a recommended index 732, corresponding to a single-column index, a two-column index, and a three-column index, respectively.

Table 2 below provides illustrative examples of the single-column recommendation values 722, two-column recommendation values 724, and the three-column recommendation value 726. Based on the values in Table 2, the index recommendation system 130 may, for instance, select the candidate index candidate_index (A) as the recommended index 728, the candidate index candidate_index (A-C) as the recommended index 730, and the candidate index candidate_index (A-B-C) as the recommended index 732. If, for example, the model output for the candidate index candidate_index (A-B-C) had indicated a negative label or a probability score of less than 50%, the index recommendation system 130 may have selected only the recommended index 728 and the recommended index 730.

TABLE 2

Examples of index recommendation values for various candidate indexes

| Candidate index | Model output: label | Model output: probability score |
|---|---|---|
| A | 1 | 96.7% |
| B | −1 | 93.3% |
| C | 1 | 35.1% |
| A-B | −1 | 80.6% |
| B-C | −1 | 52.7% |
| A-C | 1 | 93.9% |
| A-B-C | 1 | 50.3% |

The index recommendation values generated by the trained models 714, 716, and 718 are thus used by the index recommendation system 130 to decide on a recommendation. As mentioned, each model may predict a label and a probability score. However, it will be appreciated that, in other examples, a model may be trained to output only a probability score. For example, a threshold (such as 0.5 or 50%) can be set to classify candidate indexes with probabilities above the threshold as positive (recommended) and those below as negative (not recommended).

In some examples, and referring again to FIG. 6, the method 600 includes evaluating at least a subset of the candidate indexes at operation 612. Although more indexes may often lead to better performance when it comes to slow queries, there can also be drawbacks or problems associated with increasing the number of indexes linked to a database. For example, more indexes can result in increased overhead and storage space requirements. Furthermore, an index recommended by the index recommendation system 130 may be invalid or slow.

To this end, before surfacing a final recommendation, the index recommendation system 130 may evaluate performance of one or more of candidate indexes. For example, the index recommendation system 130 may use the recommendation analysis component 310 or the performance monitoring component 316 to test the recommended index 728, the recommended index 730, and the recommended index 732 against the sample library 138 of FIG. 1.

For each candidate index to be assessed, the index recommendation system 130 may check whether, based on querying the sample library 138, the candidate index is expected to result in an improvement in query execution time. For example, the index recommendation system 130 may compare a first query execution time that is measured without using the candidate index to a second query execution time that is measured when using the candidate index (in both cases against the sample library 138) to verify that response time will, or is expected to, improve.

It is noted that query execution time, or an improvement in query execution time, is one example of a performance metric that can be used in operation 612. Other performance metrics or factors, such as changes in storage or cost associated with the integration of an index, may also be considered.

The index recommendation system 130 may select at least one of the candidate indexes based, for example, on the index recommendation values and results of the performance evaluation. For example, the index recommendation system 130 may test the performance of the recommended index 728, the recommended index 730, and the recommended index 732, and determine that the recommended index 728 and the recommended index 730 (but not the recommended index 732) should be recommended to a user.

For example, the index recommendation system 130 may determine that the recommended index 732 is invalid or will not result in a sufficient improvement in query execution time, and then only select the recommended index 728 and the recommended index 730 as its final recommendations. In other words, the index recommendation system 130 may use the outputs of the trained models 714, 716, and 718 to perform a first filtering process to arrive at an initial set of recommendations, and then perform a performance assessment as a second filter process to arrive at a final set of recommendations to surface.

Referring again to FIG. 6, the method 600 proceeds to operation 614, where the index recommendation system 130 (e.g., using the user interaction component 312 and via the user interface system 132 of FIG. 1) causes presentation of one or more of the candidate indexes at a user device (e.g., the user device 108 of the user 106) as part of an index recommendation at operation 614. For example, as described with reference to FIG. 7, the index recommendation system 130 may present the recommended index 728 and the recommended index 730 at the user device 108 in a user interface of the database management system 128 or the index recommendation system 130.

In some examples, a recommended index is presented (e.g., in the web interface 140 or app interface 142 of FIG. 1) together with additional data, such as performance evaluation results (e.g., "We recommend index [INDEX_NAME]. This index is estimated to lead to a 35% improvement in query execution time.") or potential resource implications (e.g., an indication of storage space requirements associated with a recommendation). This allows the user 106 to make an informed decision with respect to a recommended index.

At operation 616, the index recommendation system 130 receives a user selection of a candidate index. For example, the user 106 may review the recommendations and use the user device 108 to select the recommended index 730, which corresponds to one of the two-column candidate indexes, for implementation. In response to the user selection, the index recommendation system 130 automatically updates a database schema (e.g., a schema of the database 136 of FIG. 1) to include the selected index.

As part of operation 618, the index recommendation system 130 may work with the index management component 218 of the database management system 128 to update the database schema to reflect the existence or details of the new index. For example, the index management component 218 may update the database schema to include or update an index definition. The index definition may indicate one or more of a name of the index, the table or tables it belongs to, and the column or columns it covers. It may also specify the type of index (such as B-tree, hash, or full-text) and whether it is unique or non-unique. The updated database schema may then be used by the database management system 128 to modify a database structure, which may involve automatically executing Data Definition Language (DDL) statements such as "CREATE INDEX" to physically implement the index in the database. The method 600 concludes at closing loop element 620.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising: identifying a plurality of candidate indexes associated with a database query that is classified as a slow query; generating, for each candidate index of the plurality of candidate indexes, a feature vector representing statement features and statistical features associated with the candidate index; providing the feature vectors to one or more machine learning models to obtain, for each candidate index of the plurality of candidate indexes, an index recommendation value; causing presentation, at a user device, of an index recommendation that identifies a first index of the plurality of candidate indexes, the first index being identified in the index recommendation based at least partially on the index recommendation value obtained for the first index; receiving user input indicative of a user selection of the first index; and in response to receiving the user input, automatically updating a database schema to include, the first index.

In Example 2, the subject matter of Example 1 includes, the operations further comprising: detecting that a query execution time of the database query exceeds a threshold; and in response to detecting that the query execution time associated with the database query exceeds the threshold: designating the database query as a slow query, and automatically triggering the obtaining of the index recommendation values.

In Example 3, the subject matter of Example 2 includes, wherein the database query is one of a plurality of database queries, the operations further comprising: using an index recommendation application to monitor the query execution time of each of the plurality of database queries, the database query being designated from among the plurality of database queries.

In Example 4, the subject matter of any of Examples 1-3 includes, the operations further comprising, prior to the presentation of the index recommendation at the user device: assessing performance of the first index according to a predetermined performance metric; and selecting, based on the performance of the first index, the first index for inclusion in the index recommendation.

In Example 5, the subject matter of Example 4 includes, wherein the assessing of the performance of the first index comprises: determining a first query execution time of the database query when executed against a subset of data from a database associated with the database query without applying the first index; determining a second query execution time of the database query when executed against the subset of data from the database by applying the first index; and comparing the first query execution time to the second query execution time.

In Example 6, the subject matter of any of Examples 4-5 includes, wherein the causing presentation of the index recommendation at the user device comprises causing generation of a user interface that presents the index recommendation together with an indication of the performance of the first index.

In Example 7, the subject matter of any of Examples 1-6 includes, wherein each candidate index of the plurality of candidate indexes has one or more candidate index columns, and the statement features indicate a location of each of the one or more candidate index columns within the database query.

In Example 8, the subject matter of Example 7 includes, wherein, for each of the one or more candidate index columns, the location is encoded in the feature vector by an encoding scheme that indicates presence or absence of respective query conditions involving the candidate index column.

In Example 9, the subject matter of any of Examples 1-8 includes, wherein each candidate index of the plurality of candidate indexes has one or more candidate index columns, and the statistical features comprise at least one of: at least one selectivity value associated with the database query, at least one cardinality value associated with the database query, number of null values in each of the one or more candidate index columns, or number of rows associated with each of the one or more candidate index columns.

In Example 10, the subject matter of any of Examples 1-9 includes, wherein at least one of the plurality of candidate indexes is a multi-column candidate index, and the feature vector for the multi-column candidate index is generated by: generating column-specific values indicative of characteristics of individual columns in the multi-column candidate index; generating multi-column values indicative of combined characteristics of the individual columns in the multi-column candidate index; and combining the column-specific values and the multi-column values.

In Example 11, the subject matter of any of Examples 1-10 includes, wherein the plurality of candidate indexes comprises a first subset and a second subset, the first subset including one or more single-column candidate indexes and the second subset including one or more multi-column candidate indexes.

In Example 12, the subject matter of Example 11 includes, wherein the one or more machine learning models comprise a first machine learning model that is trained to process each feature vector of the one or more single-column candidate indexes and at least one second machine learning model that is trained to process each feature vector of the one or more multi-column candidate indexes.

In Example 13, the subject matter of any of Examples 11-12 includes, wherein the first index is selected from the first subset, and the index recommendation further identifies a second index of the plurality of candidate indexes, the second index being selected from the second subset and identified in the index recommendation based at least partially on the index recommendation value obtained for the second index.

In Example 14, the subject matter of any of Examples 1-13 includes, wherein each of the one or more machine learning models is trained using a dataset comprising sample feature vectors, and each sample feature vector is labeled to indicate whether a sample index corresponding to the sample feature vector exists in a sample database.

Example 15 is a method comprising: identifying, by one or more computing devices, a plurality of candidate indexes associated with a database query that is classified as a slow query; generating, by the one or more computing devices and for each candidate index of the plurality of candidate indexes, a feature vector representing statement features and statistical features associated with the candidate index; providing, by the one or more computing devices, the feature vectors to one or more machine learning models to obtain, for each candidate index of the plurality of candidate indexes, an index recommendation value; causing presentation, by the one or more computing devices, of an index recommendation that identifies a first index of the plurality of candidate indexes, the first index being identified in the index recommendation based at least partially on the index recommendation value obtained for the first index; receiving, by the one or more computing devices, user input indicative of a user selection of the first index; and in response to receiving the user input, automatically updating, by the one or more computing devices, a database schema to include, the first index.

In Example 16, the subject matter of Example 15 includes, detecting that a query execution time of the database query exceeds a threshold; and in response to detecting that the query execution time associated with the database query exceeds the threshold: designating the database query as a slow query, and automatically triggering the obtaining of the index recommendation values.

In Example 17, the subject matter of any of Examples 15-16 includes, prior to presentation of the index recommendation: assessing performance of the first index according to a predetermined performance metric; and selecting, based on the performance of the first index, the first index for inclusion in the index recommendation.

Example 18 is a non-transitory computer-readable medium that stores instructions that, when executed by one or more processors, cause the one or more processors to perform operations comprising: identifying a plurality of candidate indexes associated with a database query that is classified as a slow query; generating, for each candidate index of the plurality of candidate indexes, a feature vector representing statement features and statistical features associated with the candidate index; providing the feature vector of each candidate index of the plurality of candidate indexes to a machine learning model to obtain an index recommendation value for the candidate index; causing presentation, at a user device, of an index recommendation that identifies a first index of the plurality of candidate indexes, the first index being identified in the index recommendation based at least partially on the index recommendation value obtained for the first index; receiving user input indicative of a user selection of the first index; and in response to receiving the user input, automatically updating a database schema to include, the first index.

In Example 19, the subject matter of Example 18 includes, the operations further comprising: detecting that a query execution time of the database query exceeds a threshold; and in response to detecting that the query execution time associated with the database query exceeds the threshold: designating the database query as a slow query, and automatically triggering the obtaining of the index recommendation values.

In Example 20, the subject matter of any of Examples 18-19 includes, the operations further comprising, prior to presentation of the index recommendation at the user device: assessing performance of the first index according to a predetermined performance metric; and selecting, based on the performance of the first index, the first index for inclusion in the index recommendation.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 8:
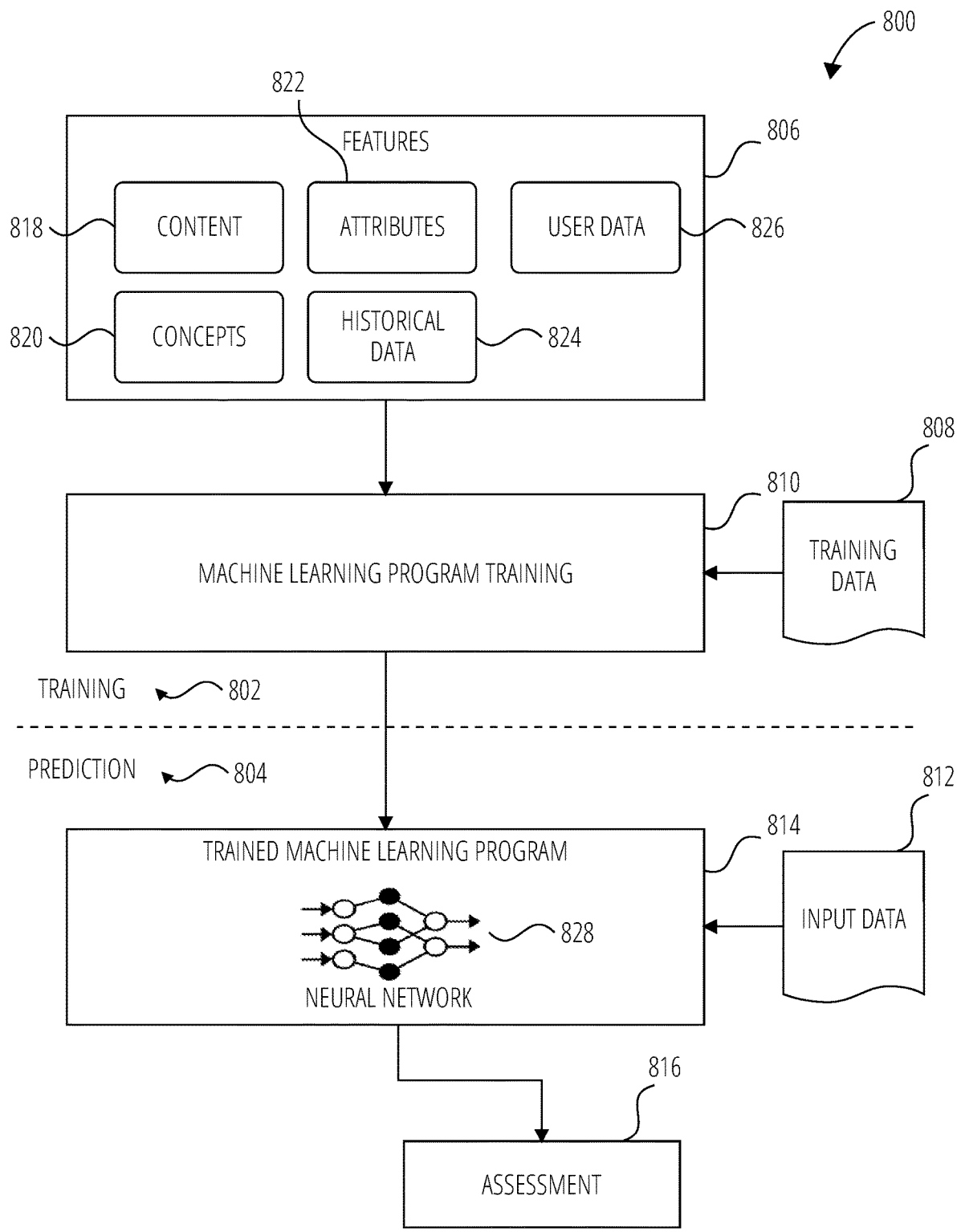
FIG. 8 diagrammatically illustrates training and use of a machine learning program, according to some examples.

FIG. 8 is a block diagram showing a machine learning program 800, according to some examples. Machine learning programs, also referred to as machine learning algorithms or tools, may be used as part of the systems described herein to perform one or more operations, e.g., to identify relations between reported issues and context data, to identify contextual dependencies, to extract or infer additional issue metadata using initial issue metadata, to generate priority ratings, to generate estimated impacts, or combinations thereof.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine learning tools operate by building a model from example training data 808 in order to make data-driven predictions or decisions expressed as outputs or assessments (e.g., assessment 816). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), matrix factorization, and Support Vector Machines (SVM) tools may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 800 supports two types of phases, namely training phases 802 and prediction phases 804. In training phases 802, supervised learning, unsupervised or reinforcement learning may be used. For example, the machine learning program 800 (1) receives features 806 (e.g., as structured or labeled data in supervised learning) and/or (2) identifies features 806 (e.g., unstructured or unlabeled data for unsupervised learning) in training data 808. In prediction phases 804, the machine learning program 800 uses the features 806 for analyzing input data 812 to generate outcomes or predictions, as examples of an assessment 816.

In the training phase 802, feature engineering is used to identify features 806 and may include identifying informative, discriminating, and independent features for the effective operation of the machine learning program 800 in pattern recognition, classification, and regression. In some examples, the training data 808 includes labeled data, which is known data for pre-identified features 806 and one or more outcomes. Each of the features 806 may be a variable or attribute, such as individual measurable property of a process, article, system, or phenomenon represented by a dataset (e.g., the training data 808). Features 806 may also be of different types, such as numeric features, strings, and graphs, and may include one or more of content 818, concepts 820, attributes 822, historical data 824 and/or user data 826, merely for example.

The concept of a feature in this context is related to that of an explanatory variable used in statistical techniques such as linear regression. Choosing informative, discriminating, and independent features is important for the effective operation of the machine learning program 800 in pattern recognition, classification, and regression. Features may be of different types, such as numeric features, strings, and graphs.

In training phases 802, the machine learning program 800 uses the training data 808 to find correlations among the features 806 that affect a predicted outcome or assessment 816. With the training data 808 and the identified features 806, the machine learning program 800 is trained during the training phase 802 at machine learning program training 810. The machine learning program 800 appraises values of the features 806 as they correlate to the training data 808. The result of the training is the trained machine learning program 814 (e.g., a trained or learned model).

Further, the training phases 802 may involve machine learning, in which the training data 808 is structured (e.g., labeled during preprocessing operations), and the trained machine learning program 814 implements a relatively simple neural network 828 capable of performing, for example, classification and clustering operations. In other examples, the training phase 802 may involve deep learning, in which the training data 808 is unstructured, and the trained machine learning program 814 implements a deep neural network 828 that is able to perform both feature extraction and classification/clustering operations.

A neural network 828 generated during the training phase 802, and implemented within the trained machine learning program 814, may include a hierarchical (e.g., layered) organization of neurons. For example, neurons (or nodes) may be arranged hierarchically into a number of layers, including an input layer, an output layer, and multiple hidden layers. Each of the layers within the neural network 828 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 828 may also be one of a number of different types of neural networks, including a single-layer feed-forward network, an Artificial Neural Network (ANN), a Recurrent Neural Network (RNN), a symmetrically connected neural network, and unsupervised pre-trained network, a transformer network, a Convolutional Neural Network (CNN), or a Recursive Neural Network (RNN), merely for example.

During prediction phases 804, the trained machine learning program 814 is used to perform an assessment. Input data 812 is provided as an input to the trained machine learning program 814, and the trained machine learning program 814 generates the assessment 816 as output, responsive to receipt of the input data 812.

Figure 9:
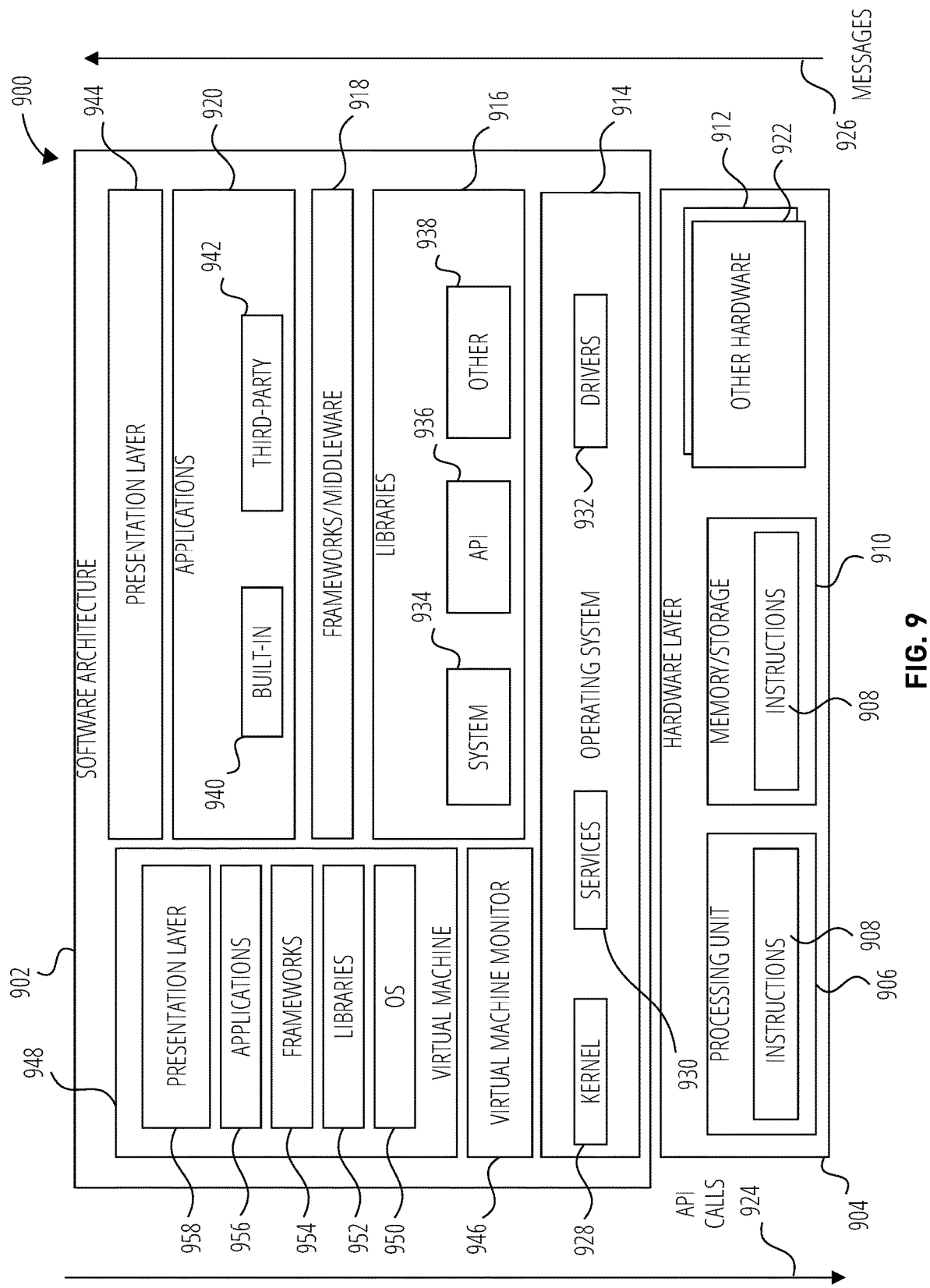
FIG. 9 is a block diagram showing a software architecture for a computing device, according to some examples.

FIG. 9 is a block diagram 900 showing a software architecture 902 for a computing device, according to some examples. The software architecture 902 may be used in conjunction with various hardware architectures, for example, as described herein. FIG. 9 is merely a non-limiting illustration of a software architecture, and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system of FIG. 10.

The representative hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912 and other hardware 922 which represent any other hardware of the hardware layer 904, such as the other hardware illustrated as part of the software architecture 902.

In the architecture of FIG. 9, the software architecture 902 may be conceptualized as a stack of layers where each layer provides particular functionality. For example, the software architecture 902 may include layers such as an operating system 914, libraries 916, frameworks/middleware layer 918, applications 920, and presentation layer 944. Operationally, the applications 920 or other components within the layers may invoke API calls 924 through the software stack and access a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the software architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 916 may provide a common infrastructure that may be utilized by the applications 920 or other components or layers. The libraries 916 typically provide functionality that allows other software modules to perform tasks in an easier fashion than to interface directly with the underlying operating system 914 functionality (e.g., kernel 928, services 930 or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks/middleware layer 918 may provide a higher-level common infrastructure that may be utilized by the applications 920 or other software components/modules. For example, the frameworks/middleware layer 918 may provide various graphic user interface (GUI) functions, high-level resource management, high-level location services, and so forth. The frameworks/middleware layer 918 may provide a broad spectrum of other APIs that may be utilized by the applications 920 or other software components/modules, some of which may be specific to a particular operating system or platform.

The applications 920 include built-in applications 940 or third-party applications 942. Examples of representative built-in applications 940 may include, but are not limited to, a contacts application, a browser application, a book reader application, a location application, a media application, a messaging application, or a game application. Third-party applications 942 may include any of the built-in applications as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 942 may invoke the API calls 924 provided by the mobile operating system such as operating system 914 to facilitate functionality described herein.

The applications 920 may utilize built in operating system functions (e.g., kernel 928, services 930 or drivers 932), libraries (e.g., system libraries 934, API libraries 936, and other libraries 938), and frameworks/middleware layer 918 to create user interfaces to interact with users of the system. Alternatively, or additionally, in some systems, interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine as well as the interface with the host operating system (e.g., operating system 914). A software architecture executes within the virtual machine 948 such as an operating system 950, libraries 952, frameworks/middleware 954, applications 956 or presentation layer 958. These layers of software architecture executing within the virtual machine 948 can be the same as corresponding layers previously described or may be different.

Certain examples are described herein as including logic or a number of components, modules, or mechanisms. Modules or components may constitute either software modules/components (e.g., code embodied (1) on a non-transitory machine-readable medium or (2) in a transmission signal) or hardware-implemented modules/components. A hardware-implemented module/component is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module/component that operates to perform certain operations as described herein.

In various examples, a hardware-implemented module/component may be implemented mechanically or electronically. For example, a hardware-implemented module/component may comprise dedicated circuitry or logic that is permanently configured (e.g., as a special-purpose processor, such as a field programmable gate array (FPGA) or an application-specific integrated circuit (ASIC)) to perform certain operations. A hardware-implemented module/component may also comprise programmable logic or circuitry (e.g., as encompassed within a general-purpose processor or another programmable processor) that is temporarily configured by software to perform certain operations. It will be appreciated that the decision to implement a hardware-implemented module/component mechanically, in dedicated and permanently configured circuitry, or in temporarily configured circuitry (e.g., configured by software) may be driven by cost and time considerations.

Accordingly, the term "hardware-implemented module" or "hardware-implemented component" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules/components are temporarily configured (e.g., programmed), each of the hardware-implemented modules/components need not be configured or instantiated at any one instance in time. For example, where the hardware-implemented modules/components comprise, a general-purpose processor configured using software, the general-purpose processor may be configured as respective different hardware-implemented modules/components at different times. Software may accordingly configure a processor, for example, to constitute a particular hardware-implemented module/component at one instance of time and to constitute a different hardware-implemented module/component at a different instance of time.

Hardware-implemented modules/components can provide information to, and receive information from, other hardware-implemented modules/components. Accordingly, the described hardware-implemented modules/components may be regarded as being communicatively coupled. Where multiple of such hardware-implemented modules/components exist contemporaneously, communications may be achieved through signal transmission (e.g., over appropriate circuits and buses that connect the hardware-implemented modules/components). In examples in which multiple hardware-implemented modules/components are configured or instantiated at different times, communications between such hardware-implemented modules/components may be achieved, for example, through the storage and retrieval of information in memory structures to which the multiple hardware-implemented modules/components have access. For example, one hardware-implemented module/component may perform an operation, and store the output of that operation in a memory device to which it is communicatively coupled. A further hardware-implemented module/component may then, at a later time, access the memory device to retrieve and process the stored output. Hardware-implemented modules/components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules/components that operate to perform one or more operations or functions. The modules/components referred to herein may, in some examples, comprise processor-implemented modules/components.

Similarly, the methods described herein may be at least partially processor-implemented. For example, at least some of the operations of a method may be performed by one or more processors or processor-implemented modules/components. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

The one or more processors may also operate to support performance of the relevant operations in a "cloud computing" environment or as a "software as a service (SaaS)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

Figure 10:
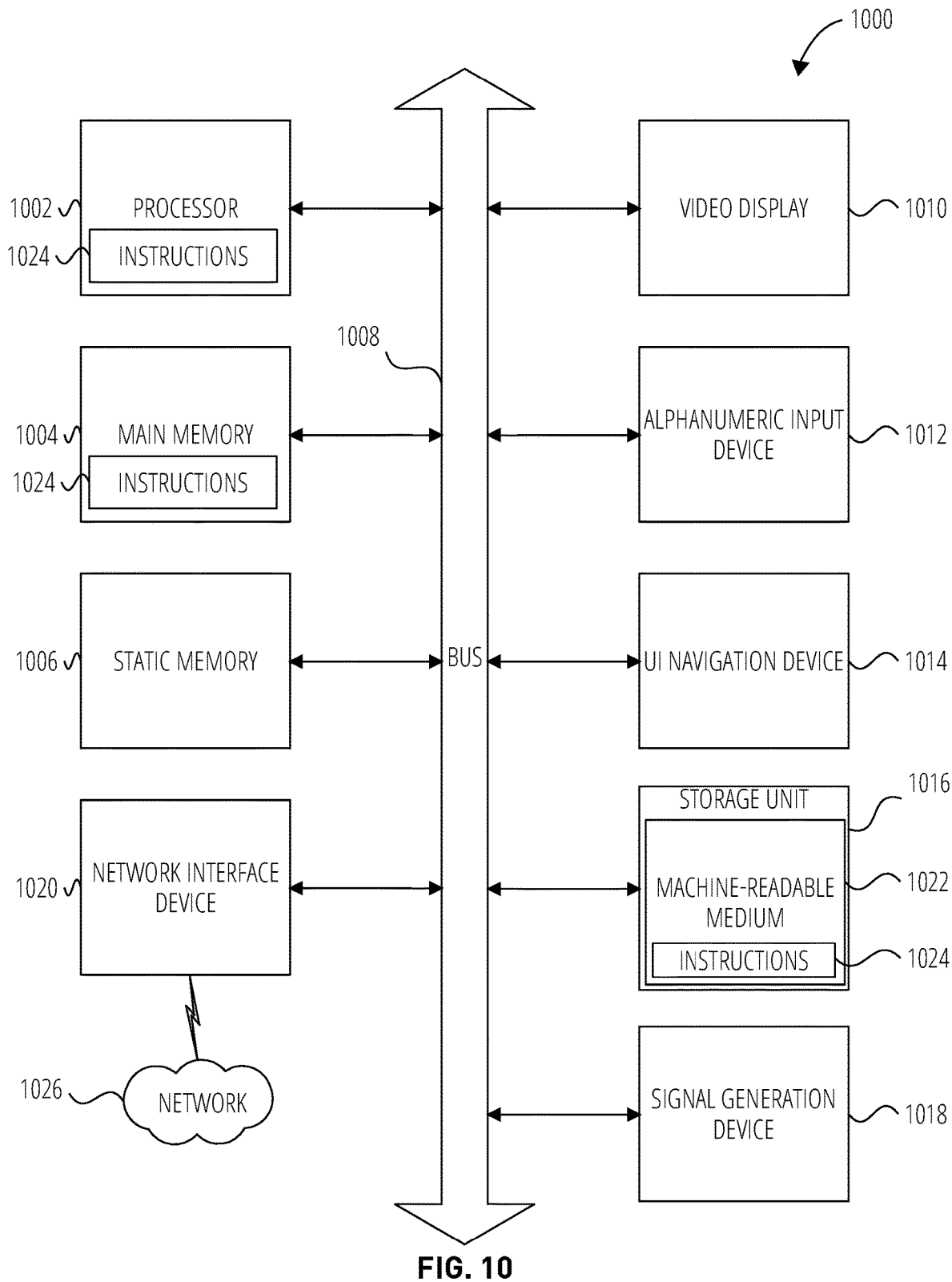
FIG. 10 is a block diagram of a machine in the form of a computer system, according to some examples, within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a GPU, or both), a primary or main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a UI navigation (or cursor control) device 1014 (e.g., a mouse), a storage unit 1016, a signal generation device 1018 (e.g., a speaker), and a network interface device 1020.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. A processor may be emulated in software, running on a physical processor, as a virtual processor or virtual circuit. The virtual processor may behave like an independent processor but is implemented in software rather than hardware.

The storage unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 or within the processor 1002 during execution thereof by the computer system 1000, with the main memory 1004 and the processor 1002 also each constituting a machine-readable medium 1022.

While the machine-readable medium 1022 is shown in accordance with some examples to be a single medium, the term "machine-readable medium" may include a single medium or multiple media (e.g., a centralized or distributed database, or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of a machine-readable medium 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 1024 may further be transmitted or received over a communications network 1026 using a transmission medium. The instructions 1024 may be transmitted using the network interface device 1020 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 1024 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually or collectively, by the term "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. Except as otherwise indicated, the word "or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" is used to refer to elements in the drawings of this disclosure for ease of reference and it will be appreciated that each "operation" may identify one or more operations, processes, actions, or steps, and may be performed by one or multiple components.

What is claimed is:

1. A system comprising:
at least one memory that stores instructions; and
one or more processors configured by the instructions to perform operations comprising:
identifying a plurality of candidate indexes associated with a database query that is classified as a slow query;
generating, for each candidate index of the plurality of candidate indexes, a feature vector representing statement features and statistical features associated with the candidate index;
providing the feature vectors to one or more machine learning models to obtain, for each candidate index of the plurality of candidate indexes, an index recommendation value;
causing presentation, at a user device, of an index recommendation that identifies a first index of the plurality of candidate indexes, the first index being identified in the index recommendation based at least partially on the index recommendation value obtained for the first index;
receiving user input indicative of a user selection of the first index; and
in response to receiving the user input, automatically updating a database schema to include the first index.

2. The system of claim 1, the operations further comprising:
detecting that a query execution time of the database query exceeds a threshold; and
in response to detecting that the query execution time associated with the database query exceeds the threshold:
designating the database query as a slow query, and
automatically triggering the obtaining of the index recommendation values.

3. The system of claim 2, wherein the database query is one of a plurality of database queries, the operations further comprising:
using an index recommendation application to monitor the query execution time of each of the plurality of database queries, the database query being designated from among the plurality of database queries.

4. The system of claim 1, the operations further comprising, prior to the presentation of the index recommendation at the user device:
assessing performance of the first index according to a predetermined performance metric; and
selecting, based on the performance of the first index, the first index for inclusion in the index recommendation.

5. The system of claim 4, wherein the assessing of the performance of the first index comprises:
determining a first query execution time of the database query when executed against a subset of data from a database associated with the database query without applying the first index;
determining a second query execution time of the database query when executed against the subset of data from the database by applying the first index; and
comparing the first query execution time to the second query execution time.

6. The system of claim 4, wherein the causing presentation of the index recommendation at the user device comprises causing generation of a user interface that presents the index recommendation together with an indication of the performance of the first index.

7. The system of claim 1, wherein each candidate index of the plurality of candidate indexes has one or more candidate index columns, and the statement features indicate a location of each of the one or more candidate index columns within the database query.

8. The system of claim 7, wherein, for each of the one or more candidate index columns, the location is encoded in the feature vector by an encoding scheme that indicates presence or absence of respective query conditions involving the candidate index column.

9. The system of claim 1, wherein each candidate index of the plurality of candidate indexes has one or more candidate index columns, and the statistical features comprise at least one of: at least one selectivity value associated with the database query, at least one cardinality value associated with the database query, number of null values in each of the one or more candidate index columns, or number of rows associated with each of the one or more candidate index columns.

10. The system of claim 1, wherein at least one of the plurality of candidate indexes is a multi-column candidate index, and the feature vector for the multi-column candidate index is generated by:
generating column-specific values indicative of characteristics of individual columns in the multi-column candidate index;
generating multi-column values indicative of combined characteristics of the individual columns in the multi-column candidate index; and
combining the column-specific values and the multi-column values.

11. The system of claim 1, wherein the plurality of candidate indexes comprises a first subset and a second subset, the first subset including one or more single-column candidate indexes and the second subset including one or more multi-column candidate indexes.

12. The system of claim 11, wherein the one or more machine learning models comprise a first machine learning model that is trained to process each feature vector of the one or more single-column candidate indexes and at least one second machine learning model that is trained to process each feature vector of the one or more multi-column candidate indexes.

13. The system of claim 11, wherein the first index is selected from the first subset, and the index recommendation further identifies a second index of the plurality of candidate indexes, the second index being selected from the second subset and identified in the index recommendation based at least partially on the index recommendation value obtained for the second index.

14. The system of claim 1, wherein each of the one or more machine learning models is trained using a dataset comprising sample feature vectors, and each sample feature vector is labeled to indicate whether a sample index corresponding to the sample feature vector exists in a sample database.

15. A method comprising:
identifying, by one or more computing devices, a plurality of candidate indexes associated with a database query that is classified as a slow query;
generating, by the one or more computing devices and for each candidate index of the plurality of candidate indexes, a feature vector representing statement features and statistical features associated with the candidate index;
providing, by the one or more computing devices, the feature vectors to one or more machine learning models to obtain, for each candidate index of the plurality of candidate indexes, an index recommendation value;
causing presentation, by the one or more computing devices, of an index recommendation that identifies a first index of the plurality of candidate indexes, the first index being identified in the index recommendation based at least partially on the index recommendation value obtained for the first index;
receiving, by the one or more computing devices, user input indicative of a user selection of the first index; and
in response to receiving the user input, automatically updating, by the one or more computing devices, a database schema to include the first index.

16. The method of claim 15, further comprising:
detecting, by the one or more computing devices, that a query execution time of the database query exceeds a threshold; and
in response to detecting that the query execution time associated with the database query exceeds the threshold:
designating, by the one or more computing devices, the database query as a slow query, and
automatically triggering, by the one or more computing devices, the obtaining of the index recommendation values.

17. The method of claim 15, further comprising, prior to presentation of the index recommendation:
assessing, by the one or more computing devices, performance of the first index according to a predetermined performance metric; and
selecting, by the one or more computing devices and based on the performance of the first index, the first index for inclusion in the index recommendation.

18. A non-transitory computer-readable medium that stores instructions that, when executed by one or more processors, cause the one or more processors to perform operations comprising:
identifying a plurality of candidate indexes associated with a database query that is classified as a slow query;
generating, for each candidate index of the plurality of candidate indexes, a feature vector representing statement features and statistical features associated with the candidate index;
providing the feature vector of each candidate index of the plurality of candidate indexes to a machine learning model to obtain an index recommendation value for the candidate index;
causing presentation, at a user device, of an index recommendation that identifies a first index of the plurality of candidate indexes, the first index being identified in the index recommendation based at least partially on the index recommendation value obtained for the first index;
receiving user input indicative of a user selection of the first index; and
in response to receiving the user input, automatically updating a database schema to include the first index.

19. The non-transitory computer-readable medium of claim 18, the operations further comprising:
detecting that a query execution time of the database query exceeds a threshold; and
in response to detecting that the query execution time associated with the database query exceeds the threshold:
designating the database query as a slow query, and
automatically triggering the obtaining of the index recommendation values.

20. The non-transitory computer-readable medium of claim 18, the operations further comprising, prior to presentation of the index recommendation at the user device:

assessing performance of the first index according to a predetermined performance metric; and selecting, based on the performance of the first index, the first index for inclusion in the index recommendation.

\* \* \* \* \*